United States Patent
McCullough et al.

(10) Patent No.: US 9,963,228 B2
(45) Date of Patent: May 8, 2018

(54) AIRCRAFT WITH SELECTIVELY ATTACHABLE PASSENGER POD ASSEMBLY

(71) Applicant: Bell Helicopter Textron Inc., Fort Worth, TX (US)

(72) Inventors: John Richard McCullough, Fort Worth, TX (US); Paul K. Oldroyd, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 215 days.

(21) Appl. No.: 15/200,163

(22) Filed: Jul. 1, 2016

(65) Prior Publication Data
US 2018/0002011 A1    Jan. 4, 2018

(51) Int. Cl.
*B64C 29/00* (2006.01)
*B64C 39/08* (2006.01)
(Continued)

(52) U.S. Cl.
CPC ............ *B64C 29/0033* (2013.01); *B64C 1/28* (2013.01); *B64C 1/32* (2013.01); *B64C 11/28* (2013.01); *B64C 17/02* (2013.01); *B64C 27/26* (2013.01); *B64C 27/28* (2013.01); *B64C 29/02* (2013.01); *B64C 39/024* (2013.01); *B64C 39/08* (2013.01); *B64D 17/80* (2013.01); *B64D 25/12* (2013.01); *B64D 27/12* (2013.01); *B64C 27/30* (2013.01); *B64C 2201/088* (2013.01); *B64C 2201/104* (2013.01); *B64C 2201/108* (2013.01); *B64C 2201/185* (2013.01); *B64C 2211/00* (2013.01)

(58) Field of Classification Search
CPC ...... B64C 29/0033; B64C 29/02; B64C 27/28
See application file for complete search history.

(56) References Cited

U.S. PATENT DOCUMENTS 1,655,113 A  *  1/1928  Tesla ................... B64C 29/0025
                                                              244/7 B
3,350,035 A      10/1967  Schlieben
(Continued)

FOREIGN PATENT DOCUMENTS

CN           105539833 A      5/2016
FR             2977865 A3      1/2013
(Continued)

OTHER PUBLICATIONS

Examination Report, Application No. 16185727.1, EPO, dated Sep. 4, 2017.
(Continued)

*Primary Examiner* — Brian M O'Hara
(74) *Attorney, Agent, or Firm* — Lawrence Youst PLLC

(57) ABSTRACT

In some embodiments, an aircraft includes a flying frame having an airframe, a propulsion system attached to the airframe and a flight control system operably associated with the propulsion system wherein, the flying frame has a vertical takeoff and landing mode and a forward flight mode. A pod assembly is selectively attachable to the flying frame such that the flying frame is rotatable about the pod assembly wherein, the pod assembly remains in a generally horizontal attitude during vertical takeoff and landing, forward flight and transitions therebetween.

18 Claims, 23 Drawing Sheets

(51) Int. Cl.
*B64C 39/02* (2006.01)
*B64D 27/12* (2006.01)
*B64C 11/28* (2006.01)
*B64D 17/80* (2006.01)
*B64C 1/28* (2006.01)
*B64C 1/32* (2006.01)
*B64C 17/02* (2006.01)
*B64C 27/26* (2006.01)
*B64C 27/28* (2006.01)
*B64C 29/02* (2006.01)
*B64D 25/12* (2006.01)
*B64C 27/30* (2006.01)

(56) References Cited

U.S. PATENT DOCUMENTS

| | | | |
|---|---|---|---|
| 3,618,875 | A | 11/1971 | Kappus |
| 3,783,618 | A | 1/1974 | Kawamura |
| 3,916,588 | A | 11/1975 | Magill |
| 4,458,864 | A | 7/1984 | Colombo et al. |
| 4,571,157 | A | 2/1986 | Eickmann |
| 4,613,098 | A | 9/1986 | Eickmann |
| 4,771,967 | A | 9/1988 | Geldbaugh |
| 4,913,377 | A | 4/1990 | Eickmann |
| 5,131,605 | A | 7/1992 | Kress |
| 5,842,667 | A | 12/1998 | Jones |
| 6,086,015 | A | 7/2000 | MacCready |
| 6,845,939 | B1 * | 1/2005 | Baldwin ............ B64C 29/0033 244/137.1 |
| 6,886,776 | B2 | 5/2005 | Wagner et al. |
| 6,892,980 | B2 | 5/2005 | Kawai |
| 7,465,236 | B2 | 12/2008 | Wagels |
| 7,472,863 | B2 | 1/2009 | Pak |
| 7,555,893 | B2 | 7/2009 | Okai et al. |
| 8,733,690 | B2 | 5/2014 | Bevirt et al. |
| 8,820,672 | B2 | 9/2014 | Erben et al. |
| 8,909,391 | B1 | 12/2014 | Peeters et al. |
| 8,948,935 | B1 | 2/2015 | Peeters et al. |
| 9,022,312 | B2 | 5/2015 | Kosheleff |
| 9,045,226 | B2 * | 6/2015 | Piasecki ............ G05D 1/102 |
| 9,087,451 | B1 | 7/2015 | Jarrell |
| 9,108,744 | B2 | 8/2015 | Takeuchi |
| 9,127,908 | B2 | 9/2015 | Miralles |
| 9,162,753 | B1 | 10/2015 | Panto et al. |
| 9,193,460 | B2 | 11/2015 | Laudrain |
| 9,221,538 | B2 | 12/2015 | Takahashi et al. |
| 9,284,049 | B1 | 3/2016 | Wang et al. |
| 9,321,530 | B2 | 4/2016 | Wang et al. |
| 9,376,208 | B1 | 6/2016 | Gentry |
| 9,403,593 | B2 | 8/2016 | Downey et al. |
| 9,440,736 | B2 | 9/2016 | Bitar |
| 9,463,875 | B2 | 10/2016 | Abuelsaad et al. |
| 9,610,817 | B1 | 4/2017 | Piasecki et al. |
| 2002/0100834 | A1 | 8/2002 | Baldwin |
| 2010/0147993 | A1 | 6/2010 | Annati et al. |
| 2011/0042509 | A1 | 2/2011 | Bevirt et al. |
| 2011/0315806 | A1 | 12/2011 | Piasecki et al. |
| 2012/0209456 | A1 | 8/2012 | Harmon et al. |
| 2014/0018979 | A1 | 1/2014 | Goossen et al. |
| 2015/0012154 | A1 | 1/2015 | Senkel et al. |
| 2015/0285165 | A1 | 10/2015 | Steinwandel et al. |
| 2017/0021924 | A1 | 1/2017 | Kubik et al. |
| 2017/0066531 | A1 | 3/2017 | McAdoo |
| 2017/0097644 | A1 | 4/2017 | Fegely et al. |
| 2017/0158312 | A1 | 6/2017 | Alber et al. |
| 2017/0297699 | A1 | 10/2017 | Alber et al. |
| 2017/0327219 | A1 | 11/2017 | Alber |
| 2017/0334557 | A1 | 11/2017 | Alber et al. |

FOREIGN PATENT DOCUMENTS

| | | |
|---|---|---|
| WO | 2001074659 A1 | 10/2001 |
| WO | 2005039973 A2 | 5/2005 |

OTHER PUBLICATIONS

Air Launched Unmanned Disaster Relief Delivery Vehicle, 33rd Annual AHS Student Design Competition, University of Maryland, Undated but admitted prior art.

* cited by examiner

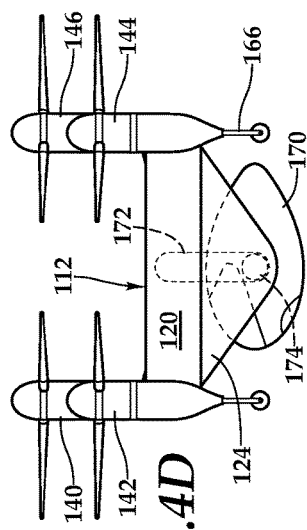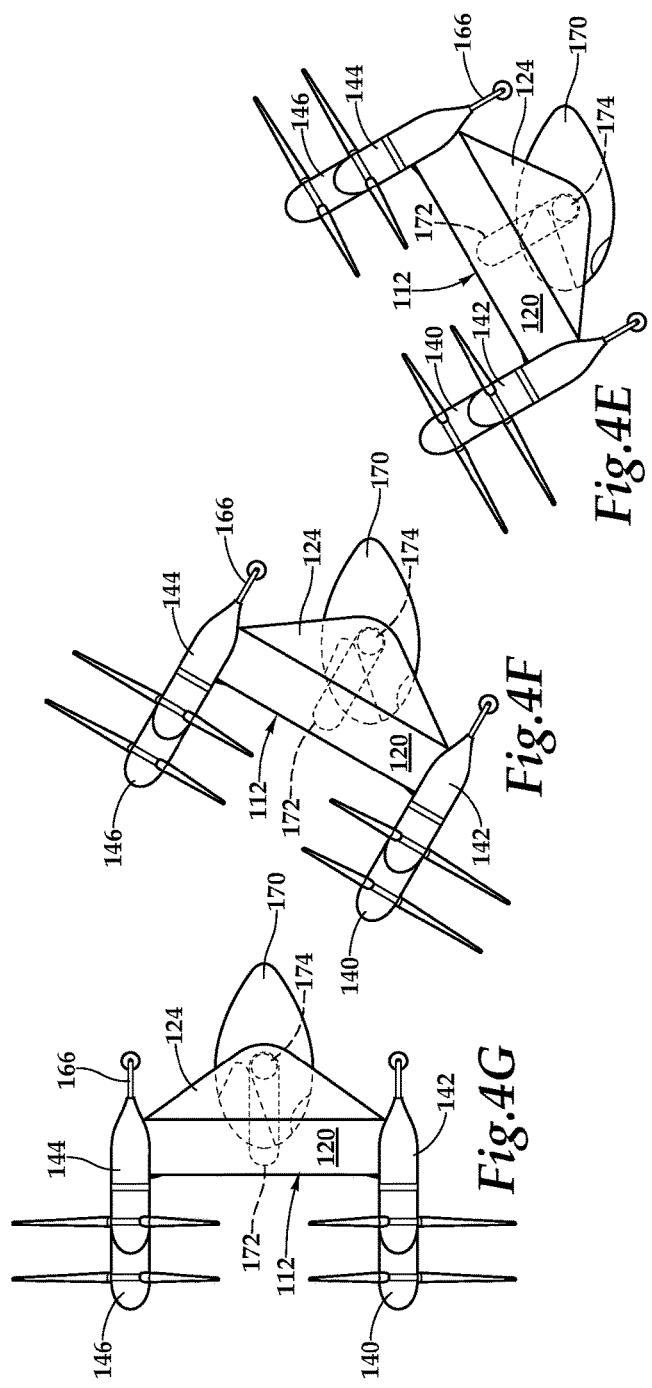

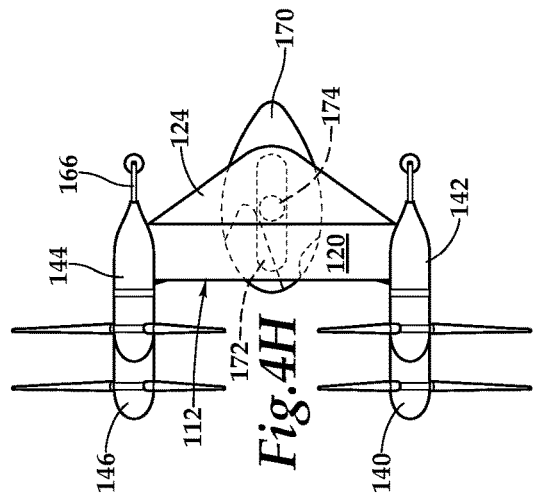
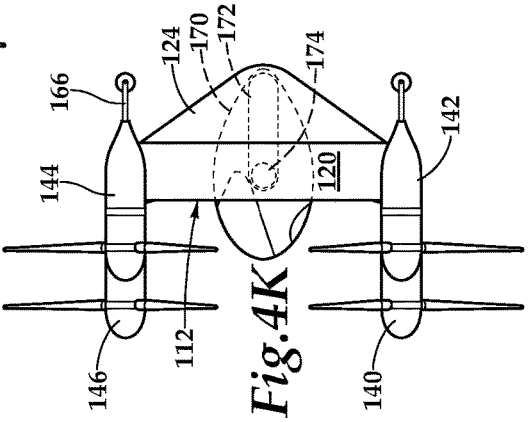
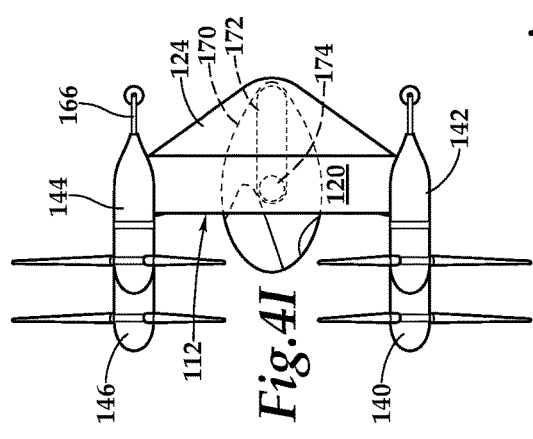
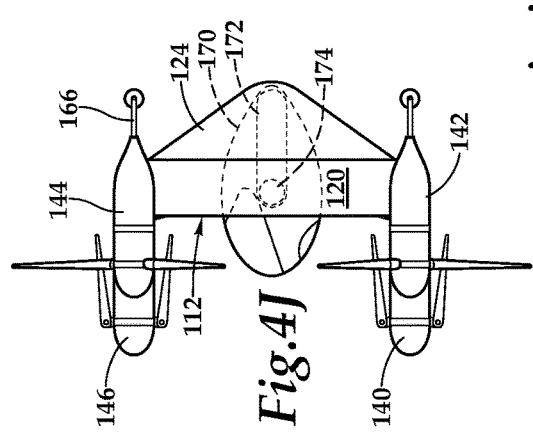
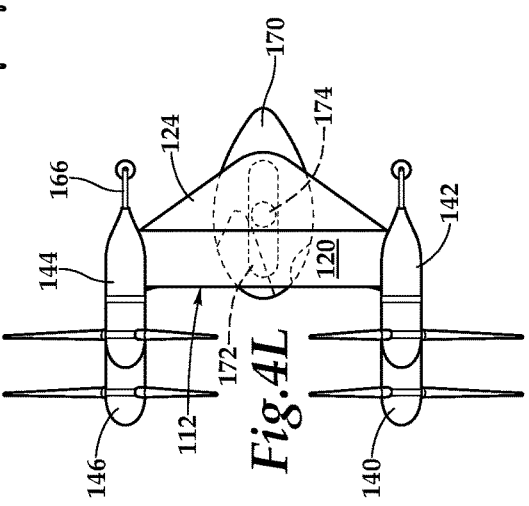

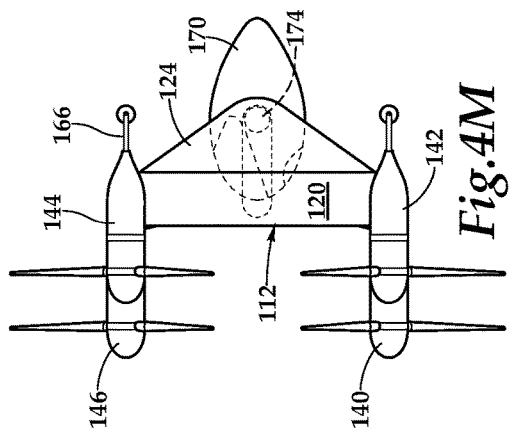
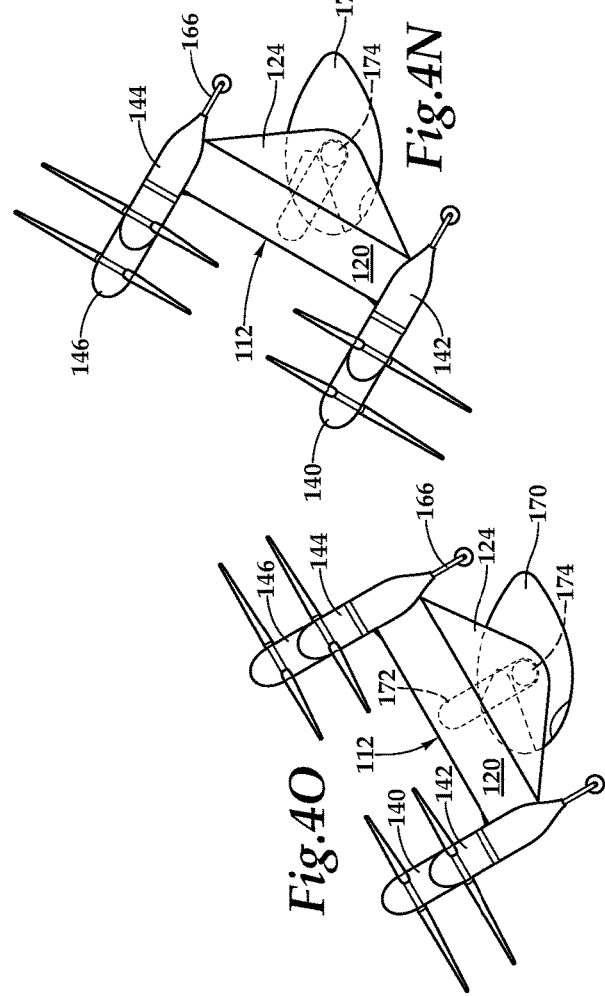
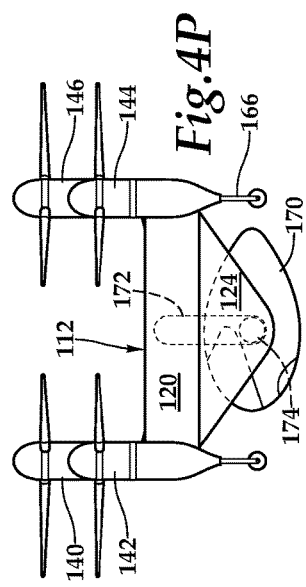

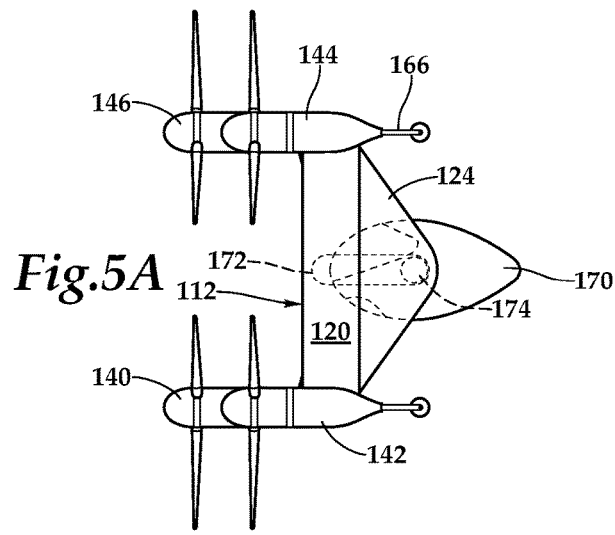
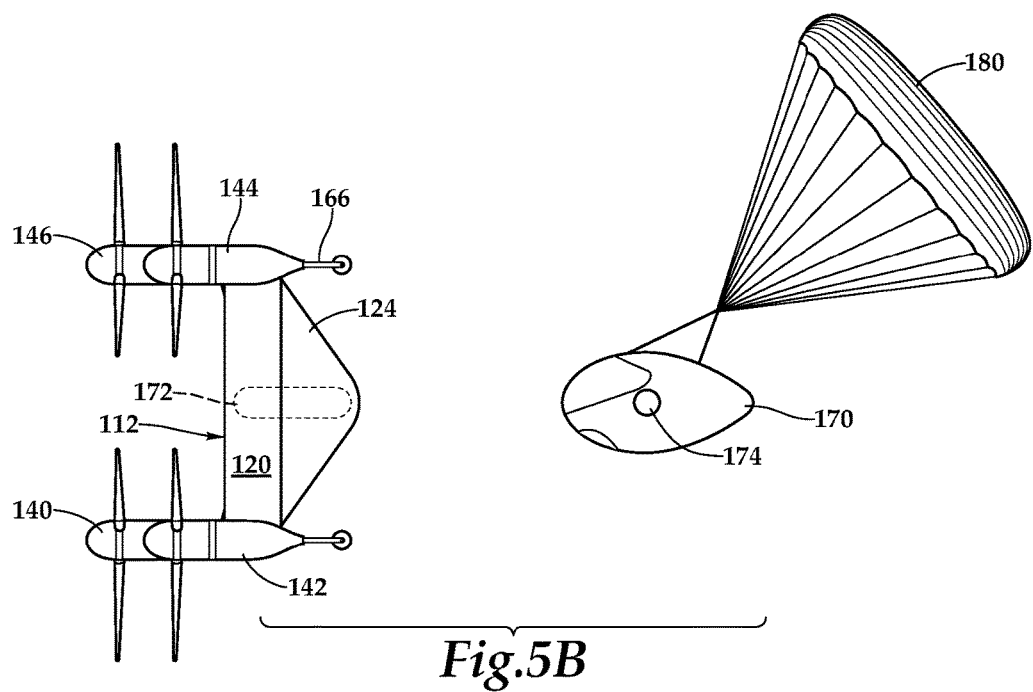
Fig.5A
Fig.5B

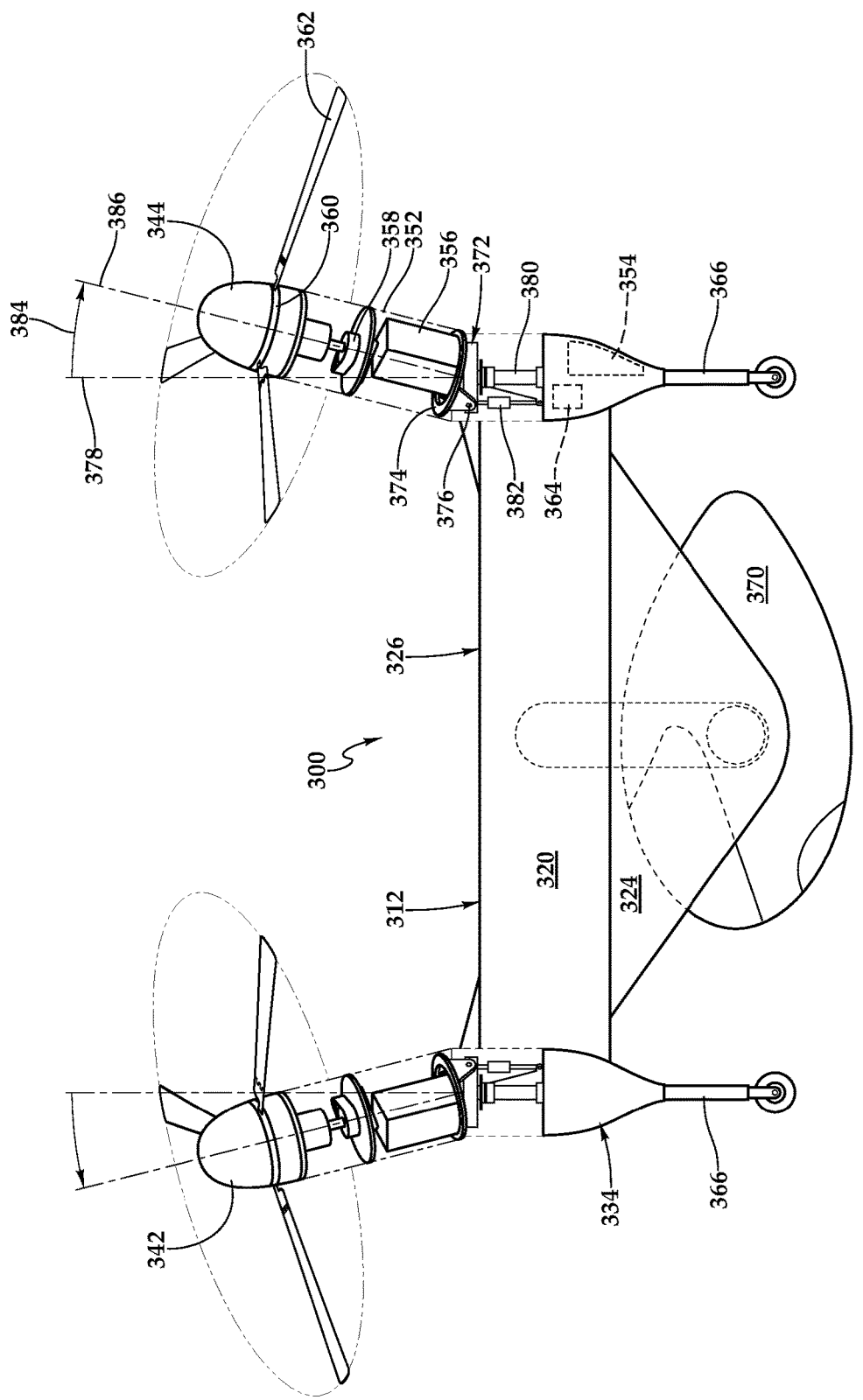

AIRCRAFT WITH SELECTIVELY ATTACHABLE PASSENGER POD ASSEMBLY

TECHNICAL FIELD OF THE DISCLOSURE

The present disclosure relates, in general, to aircraft operable to transition between a forward flight mode and a vertical takeoff and landing mode and, in particular, to aircraft having a distributed propulsion system operated by an onboard flight control system responsive to autonomous flight control, remote flight control, onboard pilot flight control and/or combinations thereof.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to an aircraft including a flying frame having an airframe, a propulsion system attached to the airframe and a flight control system operably associated with the propulsion system wherein, the flying frame has a vertical takeoff and landing mode and a forward flight mode. A pod assembly is selectively attachable to the flying frame such that the flying frame is rotatable about the pod assembly wherein, the pod assembly remains in a generally horizontal attitude during vertical takeoff and landing, forward flight and transitions therebetween.

In a second aspect, the present disclosure is directed to method of operating an aircraft including providing a flying frame including an airframe, a propulsion system attached to the airframe and a flight control system operably associated with the propulsion system; selectively attaching the flying frame to a pod assembly; lifting the pod assembly into the air in a vertical takeoff and landing mode of the aircraft with the pod assembly in a generally horizontal attitude; transitioning the aircraft between the vertical takeoff and landing mode and a forward flight mode by rotating the flying frame relative to the pod assembly while maintaining the pod assembly in the generally horizontal attitude; and transporting the pod assembly in the forward flight mode of the aircraft with the pod assembly in the generally horizontal attitude.

In a third aspect, the present disclosure is directed to an aircraft including a flying frame having an airframe, a distributed propulsion system attached to the airframe, a flight control system operably associated with the distributed propulsion system and a pod assembly selectively attachable to the flying frame. The distributed propulsion system includes a plurality of propulsion assemblies that are independently controlled by the flight control system, thereby enabling the flying frame to have a vertical takeoff and landing mode and a forward flight mode.

In a fourth aspect, the present disclosure is directed to a method of operating an aircraft including providing a flying frame including an airframe, a distributed propulsion system attached to the airframe and a flight control system operably associated with the distributed propulsion system; selectively attaching the flying frame to a pod assembly; independently controlling a plurality of propulsion assemblies of the distributed propulsion system with the flight control system; lifting the pod assembly into the air in a vertical takeoff and landing mode of the aircraft; transitioning the aircraft between the vertical takeoff and landing mode and a forward flight mode; and transporting the pod assembly in the forward flight mode of the aircraft.

In a fifth aspect, the present disclosure is directed to an aircraft including an airframe, a propulsion system attached to the airframe and a flight control system operably associated with the propulsion system. A pod assembly is selectively attachable to the flying frame. The flying frame has a vertical takeoff and landing mode and a forward flight mode. The flying frame also has a manned flight mode and an unmanned flight mode.

In a sixth aspect, the present disclosure is directed to a method of operating an aircraft including providing a flying frame including an airframe, a propulsion system attached to the airframe and a flight control system operably associated with the propulsion system; selectively attaching the flying frame to a pod assembly; lifting the pod assembly into the air in a vertical takeoff and landing mode of the aircraft; transitioning the aircraft between the vertical takeoff and landing mode and a forward flight mode; transporting the pod assembly in the forward flight mode of the aircraft; performing the lifting, transitioning and transporting in a manned flight mode; and performing the lifting, transitioning and transporting in an unmanned flight mode.

In a seventh aspect, the present disclosure is directed to an aircraft including a flying frame having an airframe with first and second wing members having a plurality of pylons extending therebetween, a distributed propulsion system including a plurality of propulsion assemblies securably attached to the airframe and a flight control system operably associated with the distributed propulsion system. The flying frame has a vertical takeoff and landing mode with the wing members disposed in generally the same horizontal plane and a forward flight mode with the wing members disposed in generally the same vertical plane. The flight control system is operable to command the propulsion assemblies responsive to at least one of remote flight control, autonomous flight control and combinations thereof.

In an eighth aspect, the present disclosure is directed to a method of operating an aircraft including providing a flying frame including an airframe with first and second wing members having a plurality of pylons extending therebetween, a distributed propulsion system including a plurality of propulsion assemblies securably attached to the airframe and a flight control system operably associated with the distributed propulsion system; vertically taking off and landing the flying frame with the wing members disposed in generally the same horizontal plane; engaging the flying frame in forward flight with the wing members disposed in generally the same vertical plane; and commanding operation of the propulsion assemblies with the flight control system responsive to at least one of remote flight control, autonomous flight control and combinations thereof.

In a ninth aspect, the present disclosure is directed to a transportation method including coupling a flying frame including an airframe, a propulsion system and a flight control system to a first passenger pod assembly at a first location; lifting the first passenger pod assembly into the air with the flying frame in a vertical takeoff and landing mode with the first passenger pod assembly in a generally horizontal attitude; transitioning the flying frame from the vertical takeoff and landing mode to a forward flight mode by rotating the flying frame relative to the first passenger pod assembly such that the first passenger pod assembly remains in the generally horizontal attitude; transporting the first passenger pod assembly from the first location to a second location with the flying frame in the forward flight mode; transitioning the flying frame from the forward flight mode to the vertical takeoff and landing mode by rotating the flying frame relative to the first passenger pod assembly such that the first passenger pod assembly remains in the generally horizontal attitude; landing the flying frame at the second location in the vertical takeoff and landing mode; and releasing the first passenger pod assembly from the flying frame at the second location.

In a tenth aspect, the present disclosure is directed to a transportation method including coupling a flying frame including an airframe, a propulsion system and a flight control system to the first pod assembly with a payload at a first location; lifting the first pod assembly into the air with the flying frame in a vertical takeoff and landing mode; transitioning the flying frame from the vertical takeoff and landing mode to a forward flight mode; transporting the first pod assembly from the first location to a second location with the flying frame in forward flight mode; transitioning the flying frame from the forward flight mode to the vertical takeoff and landing mode; landing the flying frame at the second location in the vertical takeoff and landing mode; and releasing the first pod assembly with the payload from the flying frame at the second location.

In an eleventh aspect, the present disclosure is directed to a transportation services method including receiving, at a transportation services provider system, a request for transportation of a passenger pod assembly having a current location and a destination; uploading a flight plan to a flight control system of a flying frame including an airframe and a propulsion system; dispatching the flying frame to the current location of the passenger pod assembly; coupling the flying frame to the passenger pod assembly at the current location of the passenger pod assembly; transporting the passenger pod assembly by air from the current location of the passenger pod assembly to the destination of the passenger pod assembly; and decoupling the passenger pod assembly from the flying frame at the destination of the passenger pod assembly.

In a twelfth aspect, the present disclosure is directed to a passenger pod assembly transportation system including a transportation services provider computing system and a plurality of flying frame flight control systems each having logic stored within a non-transitory computer readable medium, the logic executable by a processor, wherein the system is configured to receive, at the transportation services provider computing system, a request for transportation of a passenger pod assembly having a current location and a destination; upload a flight plan to a flight control system of a flying frame including an airframe and a propulsion system; dispatch the flying frame to the current location of the passenger pod assembly; couple the flying frame to the passenger pod assembly at the current location of the passenger pod assembly; transport the passenger pod assembly by air from the current location of the passenger pod assembly to the destination of the passenger pod assembly; and decouple the passenger pod assembly from the flying frame at the destination of the passenger pod assembly.

In a thirteenth aspect, the present disclosure is directed to a non-transitory computer readable storage media comprising a set of computer instructions executable by one or more processors for operating a passenger pod assembly transportation system, the computer instructions configured to receive, at the transportation services provider computing system, a request for transportation of a passenger pod assembly having a current location and a destination; upload a flight plan to a flight control system of a flying frame including an airframe and a propulsion system; dispatch the flying frame to the current location of the passenger pod assembly; couple the flying frame to the passenger pod assembly at the current location of the passenger pod assembly; transport the passenger pod assembly by air from the current location of the passenger pod assembly to the destination of the passenger pod assembly; and decouple the passenger pod assembly from the flying frame at the destination of the passenger pod assembly.

In a fourteenth aspect, the present disclosure is directed to a propulsion assembly for an aircraft including a nacelle, at least one self-contained fuel tank disposed within the nacelle operable to contain a liquid fuel, an engine disposed within the nacelle operable to run on the liquid fuel, a drive system mechanically coupled to the engine and operable to rotate responsive to rotation of the engine, a rotor hub mechanically coupled to the drive system operable to rotate responsive to rotation of the drive system and a proprotor mechanically coupled to the rotor hub and operable to rotate therewith.

In a fifteenth aspect, the present disclosure is directed to an aircraft including an airframe and a distributed propulsion system including a plurality of propulsion assembles securable attachable to the airframe. Each of the propulsion assembles includes a nacelle, at least one self-contained fuel tank disposed within the nacelle operable to contain a liquid fuel, an engine disposed within the nacelle operable to run on the liquid fuel, a drive system mechanically coupled to the engine and operable to rotate responsive to rotation of the engine, a rotor hub mechanically coupled to the drive system operable to rotate responsive to rotation of the drive system and a proprotor mechanically coupled to the rotor hub and operable to rotate therewith.

In a sixteenth aspect, the present disclosure is directed to an aircraft including a flying frame having an airframe, a distributed propulsion system attached to the airframe, the distributed propulsion system including a plurality of propulsion assemblies and a flight control system operably associated with the distributed propulsion system. The flying frame has a vertical takeoff and landing mode and a forward flight mode. The flight control system is operable to independently control the propulsion assemblies. The flight control system is also operable to detect faults in individual propulsion assemblies and to perform corrective action responsive to detected faults at a distributed propulsion system level.

In a seventeenth aspect, the present disclosure is directed to an aircraft including a flying frame having an airframe, a distributed propulsion system attached to the airframe, the distributed propulsion system including a plurality of propulsion assemblies, a triply redundant flight control system operably associated with the distributed propulsion system and a passenger pod assembly selectively attachable to the flying frame. The flight control system is operable to independently control the propulsion assemblies. The flight control system is also operable to detect faults in individual propulsion assemblies and to perform corrective action responsive to detected faults at a distributed propulsion system level.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 5A-5D are schematic illustrations of an aircraft in a sequential flight operating scenario in accordance with embodiments of the present disclosure;

FIGS. 7A-7C are schematic illustrations of an aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1B:
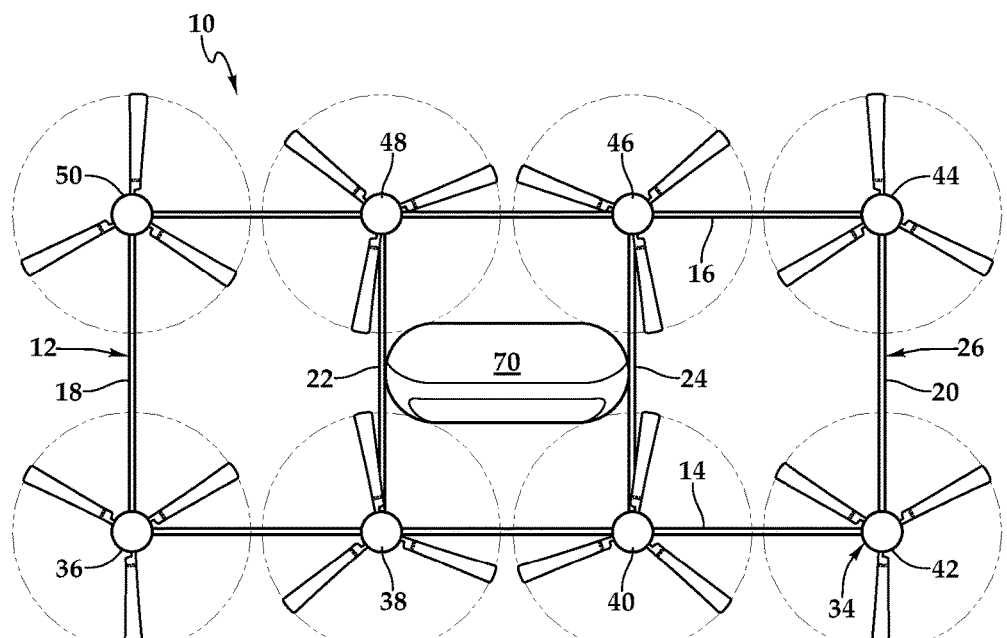
FIGS. 1A-1C are schematic illustrations of an aircraft in accordance with embodiments of the present disclosure.
Figure 1A:
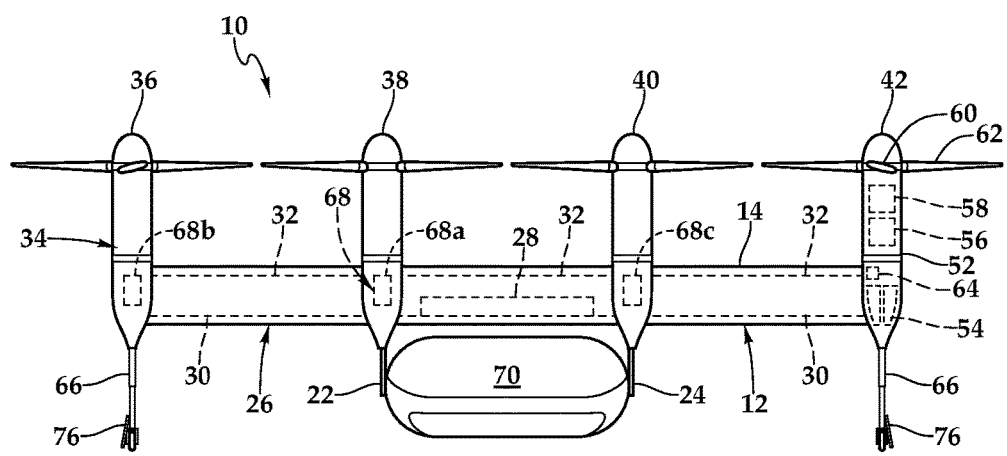
Figure 1D:
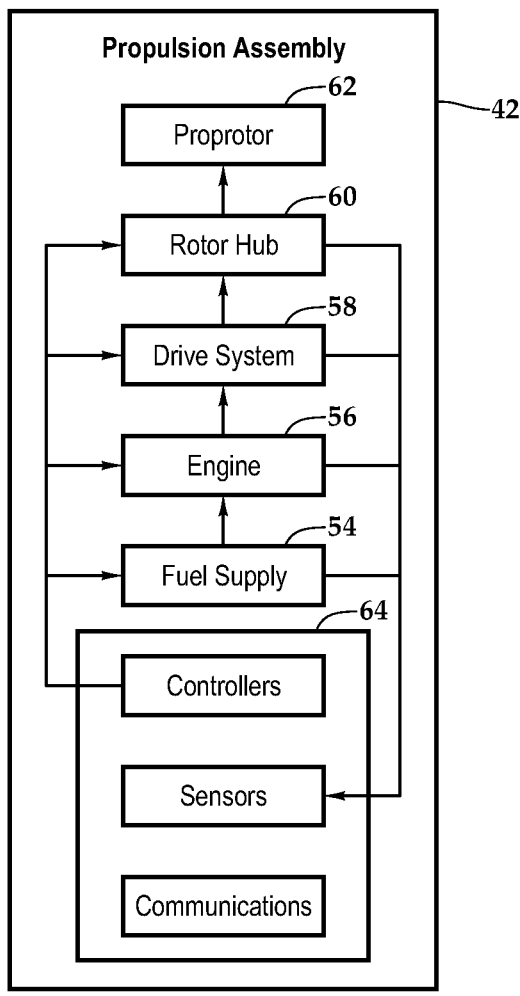
FIG. 1D is a block diagram of a propulsion assembly of an aircraft in accordance with embodiments of the present disclosure.
Figure 1C:
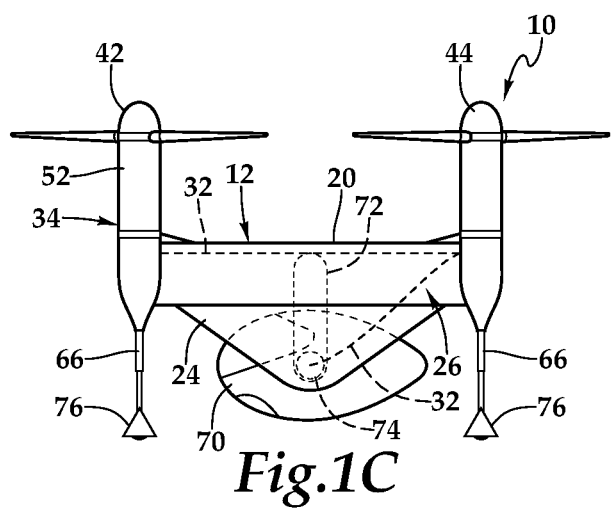

Referring to FIGS. 1A-1C in the drawings, various views of an aircraft 10 are depicted. In the illustrated embodiment, aircraft 10 including a flying frame 12 having a wing member 14 and a wing member 16. Wing members 14, 16 are generally parallel with each other and extend the entire length of aircraft 10. Preferably, wing members 14, 16 each have an airfoil cross-section that generates lift responsive to the forward airspeed of aircraft 10. Wing members 14, 16 may be formed as single members or may be segmented wing members, for example, having three sections. Wing members 14, 16 may be metallic wing members or may be formed by curing together a plurality of material layers such as fiberglass fabric, carbon fabric, fiberglass tape, carbon tape and combinations thereof or from other high strength, lightweight materials.

Extending generally perpendicularly between wing members 14, 16 are outboard pylons 18, 20 and inboard pylons 22, 24. Together, wing members 14, 16 and pylons 18, 20, 22, 24 form an airframe 26 with wing members 14, 16 and outboard pylons 18, 20 being the outer structural members and inboard pylons 22, 24 providing internal structural support. Outboard pylons 18, 20 and inboard pylons 22, 24 may be metallic members or may be formed by curing together a plurality of material layers such as fiberglass fabric, carbon fabric, fiberglass tape, carbon tape and combinations thereof or from other high strength, lightweight materials. Preferably, wing members 14, 16 and pylons 18, 20, 22, 24 are securely attached together at the respective intersections by bolting, bonding and/or other suitable technique such that airframe 26 becomes a unitary member. Wing members 14, 16 and pylons 18, 20, 22, 24 preferably include central passageways operable to contain one or more fuel tanks 28, a fuel distribution network 30 and/or a communications network 32. Alternatively, fuel tanks, a fuel distribution network and/or a communications network could be supported on the exterior of airframe 26.

In the illustrated embodiment, flying frame 12 includes a distributed propulsion system 34 depicted as eight independent propulsion assemblies 36, 38, 40, 42, 44, 46, 48, 50. It should be noted, however, that a distributed propulsion system of the present disclosure could have any number of independent propulsion assemblies. In the illustrated embodiment, propulsion assemblies 36, 38, 40, 42, 44, 46, 48, 50 are securably attached to airframe 26 in a mid wing configuration at respective intersections of wing members 14, 16 and pylons 18, 20, 22, 24 by bolting or other suitable technique. Preferably, each propulsion assembly 36, 38, 40, 42, 44, 46, 48, 50 includes a nacelle, one or more fuel tanks, an engine, a drive system, a rotor hub, a proprotor and an electronics node including, for example, controllers, sensors and communications elements. As best seen in FIGS. 1A and 1D, propulsion assembly 42 includes a nacelle 52, one or more fuel tanks 54, an engine 56, a drive system 58, a rotor hub 60, a proprotor 62 and an electronics node 64.

Each nacelle houses the fuel tanks, the engine, the drive system, the rotor hub and the electronics node of one of the propulsion assemblies. The nacelles are standardized units that are preferably line replaceable units enabling easy installation on and removal from flying frame 12, which enhances maintenance operations. For example, if a fault is discovered with one of the propulsion assemblies, the nacelle can be decoupled from the flying frame by unbolting structural members and disconnecting electronic couplings or other suitable procedure and another nacelle can be coupled to the flying frame by bolting, electronic coupling and/or other suitable procedures. The fuel tanks of each propulsion assembly 36, 38, 40, 42, 44, 46, 48, 50 may be connected to fuel distribution network 30 and serve as feeder tanks for the engines of respective propulsion assemblies. Alternatively, the fuel system for flying frame 12 may be a distributed fuel system wherein fuel for each propulsion assembly 36, 38, 40, 42, 44, 46, 48, 50 is fully self-contained within integral fuel tanks positioned within the nacelles, in which case, the wet wing system described above including fuel tank 28 and fuel distribution network 30, may not be required.

The engines of each propulsion assembly 36, 38, 40, 42, 44, 46, 48, 50 may be liquid fuel powered engines such as gasoline, jet fuel or diesel powered engines including rotary engines such as dual rotor or tri rotor engines or other high power-to-weight ratio engines. Alternatively, some or all of the engines of propulsion assembly 36, 38, 40, 42, 44, 46, 48, 50 may be electric motors operated responsive to a distributed electrical system wherein battery systems are housed within each nacelle or wherein electrical power is supplied to the electric motors from a common electrical source integral to or carried by flying frame 12. As another alternative, some or all of the engines of propulsion assembly 36, 38, 40, 42, 44, 46, 48, 50 may be hydraulic motors operated responsive to distributed hydraulic fluid system wherein high pressure hydraulic sources or generators are housed within each nacelle or a common hydraulic fluid system integral to or carried by flying frame 12.

The drive systems of each propulsion assembly 36, 38, 40, 42, 44, 46, 48, 50 may include multistage transmissions operable for reduction drive such that optimum engine rotation speed and optimum proprotor rotation speed are enabled. The drive systems may utilize high-grade roller chains, spur and bevel gears, v-belts, high strength synchronous belts or the like. As one example, the drive system may be a two-staged cogged belt reducing transmission including a 3 to 1 reduction in combination with a 2 to 1 reduction resulting in a 6 to 1 reduction between the engine and the rotor hub. The rotor hubs of each propulsion assembly 36, 38, 40, 42, 44, 46, 48, 50 are preferably simple, lightweight, rigid members having radial/thrust bearings on stub arms at two stations to carry the centrifugal loads and to allow feathering, collective control and/or cyclic control.

The proprotors of each propulsion assembly 36, 38, 40, 42, 44, 46, 48, 50 may include a plurality of proprotor blades each of which is securably attached to a hub bearing. The blades are preferably operable for collective pitch control and/or cyclic pitch control. As an alternative, the pitch of the blades may be fixed, in which case, thrust is determined by changes in the rotational velocity of the proprotor. Preferably, the blades are installed using a simple clevis hinge to enable passive stop-fold, so that forward flight drag acts to push the blades down against the nacelle surface when the associated engines are shut down to reduce drag and increase range and speed of aircraft 10. Preferably, the length of each nacelle is suitably forward to accommodate the passive stop-fold and may include a ring snubber or other suitable shield located around the nacelle to prevent damage to the blades or the nacelle when the blades make contact with the nacelle as well as to secure the blades while in forward flight to prevent dynamic slapping of the blade against the nacelle. Alternatively or additionally, to reduce forward flight drag, the proprotor blades may be operable to be feathered when the associated engines are shut down. In this case, the proprotor blades may be locked in the feathered position or allowed to windmill in response to the forward flight of aircraft 10. The blade hinges may also include a stop in the centrifugal extended position when feathered so that as collective is applied and the blades generate lift and cone forward, the stop engagement reduces hinge wear and/or fretting. Even though the propulsion assemblies of the present disclosure have been described as having certain nacelles, fuel tanks, engines, drive systems, rotor hubs and proprotors, it is to be understood by those skilled in the art that propulsion assemblies having other components or combinations of components suitable for use in a distributed and/or modular propulsion assembly system are also possible and are considered to be within the scope of the present disclosure.

Flying frame 12 includes landing gear depicted as landing struts 66 such as passively operated pneumatic landing struts or actively operated telescoping landing struts positioned on outboard propulsion assemblies 36, 42, 44, 50. In the illustrated embodiment, landing struts 66 include wheels that enable flying frame 12 to taxi or be rolled when on a surface. Each wheel may include a braking system such as an electromechanical braking system or a manual braking system to facilitate parking as required during ground operations. Landing struts 66 include tail feathers or fairings 76 that act as vertical stabilizers to improve the yaw stability of aircraft 10 during forward flight.

Flying frame 12 includes a flight control system 68, such as a digital flight control system, that is disposed with nacelles of distributed propulsion system 34. Flight control system 68 could alternatively be located within a central passageway of a wing member 14, 16 or pylon 18, 20, 22, 24 or could be supported on the exterior of airframe 26. In the illustrated embodiment, flight control system 68 is a triply redundant flight control system including flight control computer 68A disposed within the nacelle of propulsion assembly 38, flight control computer 68B disposed within the nacelle of propulsion assembly 36 and flight control computer 68C disposed within the nacelle of propulsion assembly 40. Use of triply redundant flight control system 68 having redundant components located in different nacelles improves the overall safety and reliability of aircraft 10 in the event of a failure in flight control system 68. Flight control system 68 preferably includes non-transitory computer readable storage media including a set of computer instructions executable by processors for controlling the operation of distributed propulsion system 34. Flight control system 68 may be implemented on one or more general-purpose computer, special purpose computers or other machines with memory and processing capability. For example, flight control system 68 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 68 may be a microprocessor-based system operable to execute program code in the form of machine-executable instructions. In addition, flight control system 68 may be selectively connectable to other computer systems via a proprietary encrypted network, a public encrypted network, the Internet or other suitable communication network that may include both wired and wireless connections.

As illustrated, flight control system 68 communicates via communications network 32 with the electronics nodes of each propulsion assembly 36, 38, 40, 42, 44, 46, 48, 50, such as electronics node 64 of propulsion assembly 42. Flight control system 68 receives sensor data from and sends flight command information to the electronics nodes of each propulsion assembly 36, 38, 40, 42, 44, 46, 48, 50 such that each propulsion assembly 36, 38, 40, 42, 44, 46, 48, 50 may be individually and independently controlled and operated. In both manned and unmanned missions, flight control system 68 may autonomously control some or all aspects of flight operation for aircraft 10. Flight control system 68 is also operable to communicate with remote systems, such as a transportation services provider system via a wireless communications protocol. The remote system may be operable to receive flight data from and provide commands to flight control system 68 to enable remote flight control over some or all aspects of flight operation for aircraft 10, in both manned and unmanned missions.

Aircraft 10 includes a pod assembly, illustrated as passenger pod assembly 70, that is selectively attachable to flying frame 12 between inboard pylons 22, 24. In the illustrated embodiment, inboard pylons 22, 24 have generally triangular tapered trailing edges that include receiving assemblies 72 for coupling with joint members 74 of pod assembly 70. As discussed herein, the connection between receiving assemblies 72 and joint members 74 preferably allows pod assembly 70 to rotate and translate relative to flying frame 12 during flight operations. In addition, one or more communication channels are established between pod assembly 70 and flying frame 12 when pod assembly 70 and flying frame 12 are attached. For example, a quick disconnect harness may be coupled between pod assembly 70 and flying frame 12 to allow a pilot within pod assembly 70 to receive flight data from and provide commands to flight control system 68 to enable onboard pilot control over some or all aspects of flight operation for aircraft 10.

Referring to FIGS. 2A-2E in the drawings, various views of aircraft 10 are depicted. In the illustrated embodiment, aircraft 10 including a flying frame 12 having wing members 14, 16, outboard pylons 18, 20 and inboard pylons 22, 24 forming airframe 26. Flying frame 12 also includes a distributed propulsion system 34 depicted as eight independent propulsion assemblies 36, 38, 40, 42, 44, 46, 48, 50. Landing struts 66 telescopically extend from propulsion assemblies 36, 42, 44, 50. Flying frame 12 includes a flight control system 68 including flight control computers 68A-68C that are disposed with nacelles of distributed propulsion system 34 that, as discussed herein, communicate with the electronics nodes of each propulsion assembly 36, 38, 40, 42, 44, 46, 48, 50 receiving sensor data from and sending flight command information to the electronics nodes, thereby individually and independently controlling and operating each propulsion assembly 36, 38, 40, 42, 44, 46, 48, 50. In the illustrated embodiment, aircraft 10 includes a pod assembly, illustrated as passenger pod assembly 70, that is selectively attachable to flying frame 12 between inboard pylons 22, 24.

Figure 2C:
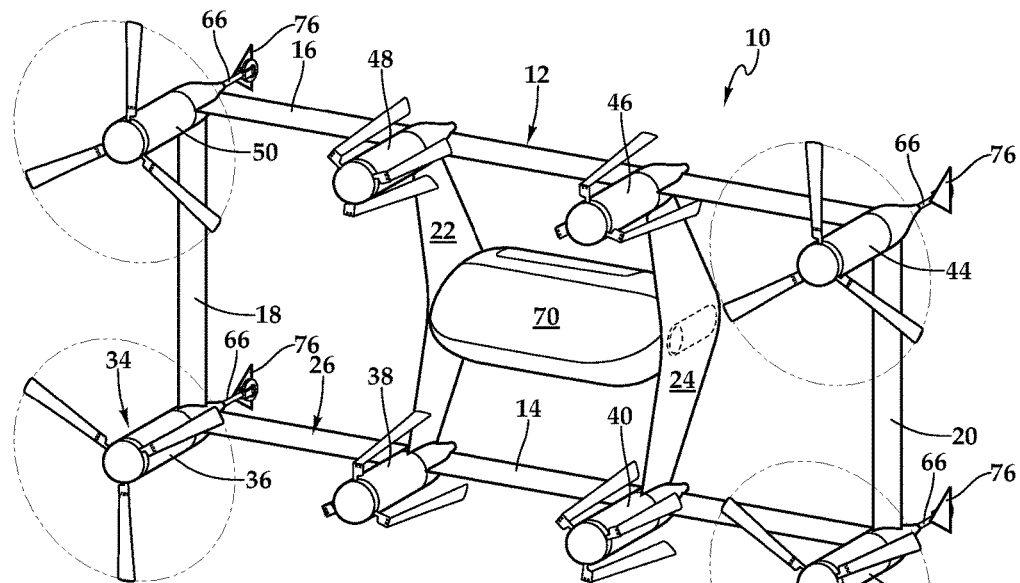
FIGS. 2A-2E are schematic illustrations of an aircraft in accordance with embodiments of the present disclosure.
Figure 2B:
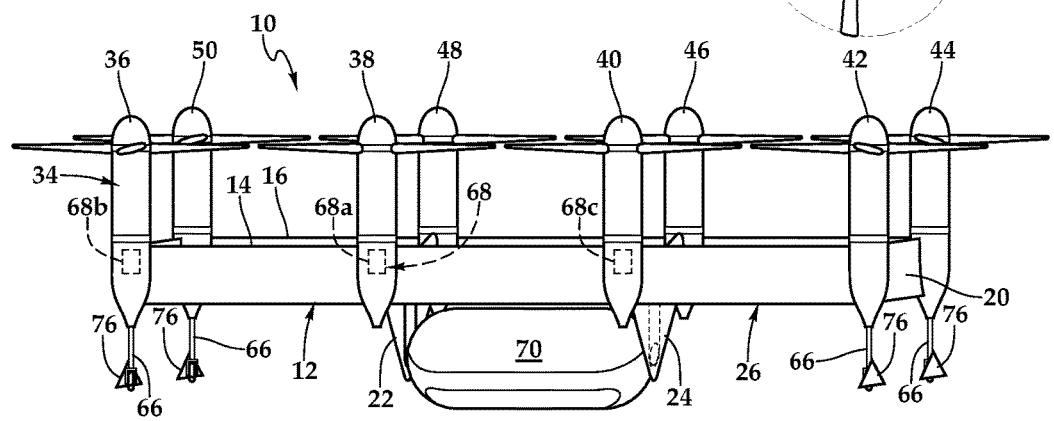
Figure 2A:
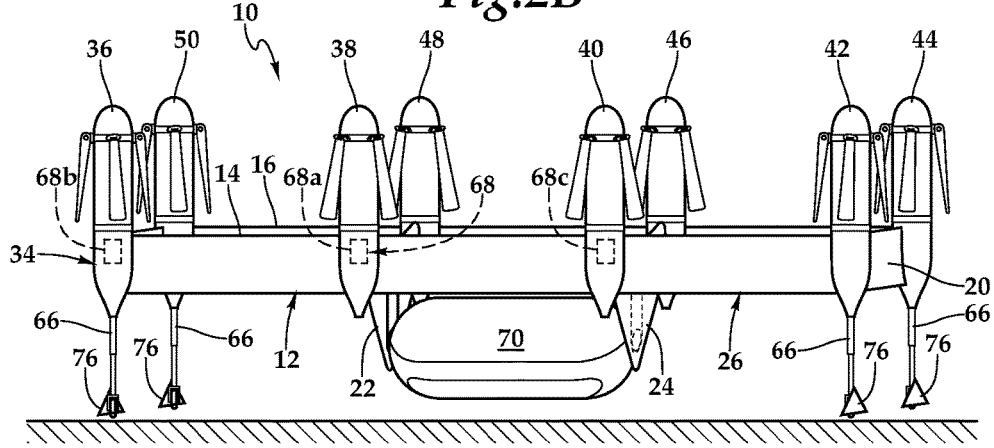

As best seen in FIG. 2A, aircraft 10 is in a resting mode with the wheels of landing struts 66 in contact with the ground or other surface, such as the flight deck of an aircraft carrier. As illustrated, wing members 14, 16 are generally above pod assembly 70 with wing member 14 forward of and wing member 16 aft of pod assembly 70. In addition, the blades of all the proprotors are folded downwardly to reduce the footprint of aircraft 10 in its resting mode. As best seen in FIG. 2B, aircraft 10 is in a vertical takeoff and landing mode. Wing members 14, 16 remain above pod assembly 70 with wing member 14 forward of and wing member 16 aft of pod assembly 70 and with wing members 14, 16 disposed in generally the same horizontal plane. As the thrust requirement for vertical takeoff, vertical landing and hovering is high, all propulsion assemblies 36, 38, 40, 42, 44, 46, 48, 50 are operating to generate vertical thrust. It is noted that flight control system 68 independently controls and operates each propulsion assembly 36, 38, 40, 42, 44, 46, 48, 50. For example, flight control system 68 is operable to independently control collective pitch, cyclic pitch and/or rotational velocity for proprotors of each propulsion assembly 36, 38, 40, 42, 44, 46, 48, 50, which can be beneficial in stabilizing aircraft 10 during vertical takeoff, vertical landing and hovering. Alternatively or additionally, as discussed herein, flight control system 68 may be operable to independently control and adjust the thrust vector of some or all of the propulsion assembly 36, 38, 40, 42, 44, 46, 48, 50, which can also be beneficial in stabilizing aircraft 10 during vertical takeoff, vertical landing and hovering.

As best seen in FIG. 2C, aircraft 10 is in a forward flight mode. Wing members 14, 16 are generally forward of pod assembly 70 with wing member 14 below and wing member 16 above pod assembly 70 and with wing members 14, 16 disposed in generally the same vertical plane. As the thrust requirement for forward flight is reduced compared to vertical takeoff and landing, outboard propulsion assemblies 36, 42, 44, 50 are operating while inboard propulsion assemblies 38, 40, 46, 48 have been shut down. In the illustrated embodiment, the proprotors blades of inboard propulsion assemblies 38, 40, 46, 48 have folded to reduce air resistance and improve the endurance of aircraft 10. Alternatively, inboard propulsion assemblies 38, 40, 46, 48 may be rotated to a feathered position and locked to prevent rotation or allowed to windmill during engine shut down to reduce forward drag during forward flight. Preferably, the proprotors blades fold passively when inboard propulsion assemblies 38, 40, 46, 48 are shut down, and then extend upon reengagement of inboard propulsion assemblies 38, 40, 46, 48. The outer surface of the nacelles may include a receiving element to secure the folded proprotor blades and prevent chatter during forward flight. Inboard propulsion assemblies 38, 40, 46, 48 and/or outboard propulsion assemblies 36, 42, 44, 50 may have an angle of attack less than that of wing members 14, 16. Alternatively and additionally, some or all of the propulsion assembly 36, 38, 40, 42, 44, 46, 48, 50 may be operated with an angle of attack relative to wing members 14, 16 using trust vectoring as discussed herein. In the illustrated embodiment, the proprotor blades of propulsion assemblies 36, 38, 48, 50 rotate counterclockwise while the proprotor blades of propulsion assemblies 40, 42, 44, 46 rotate clockwise to balance the torque of aircraft 10.

Figure 2D:
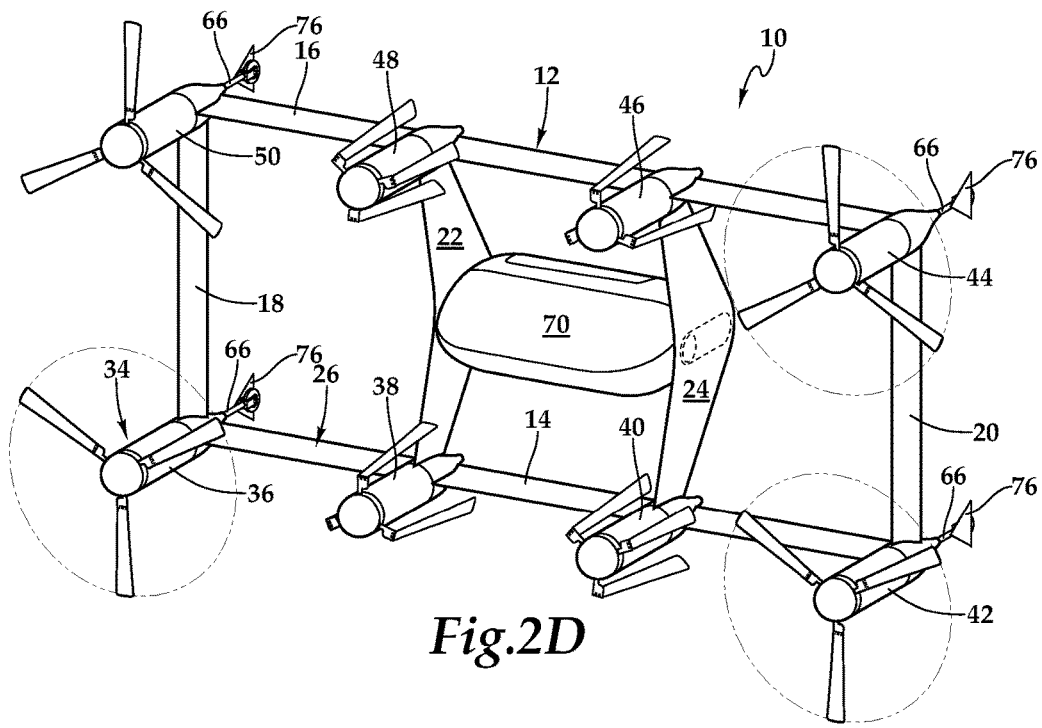
Figure 2E:
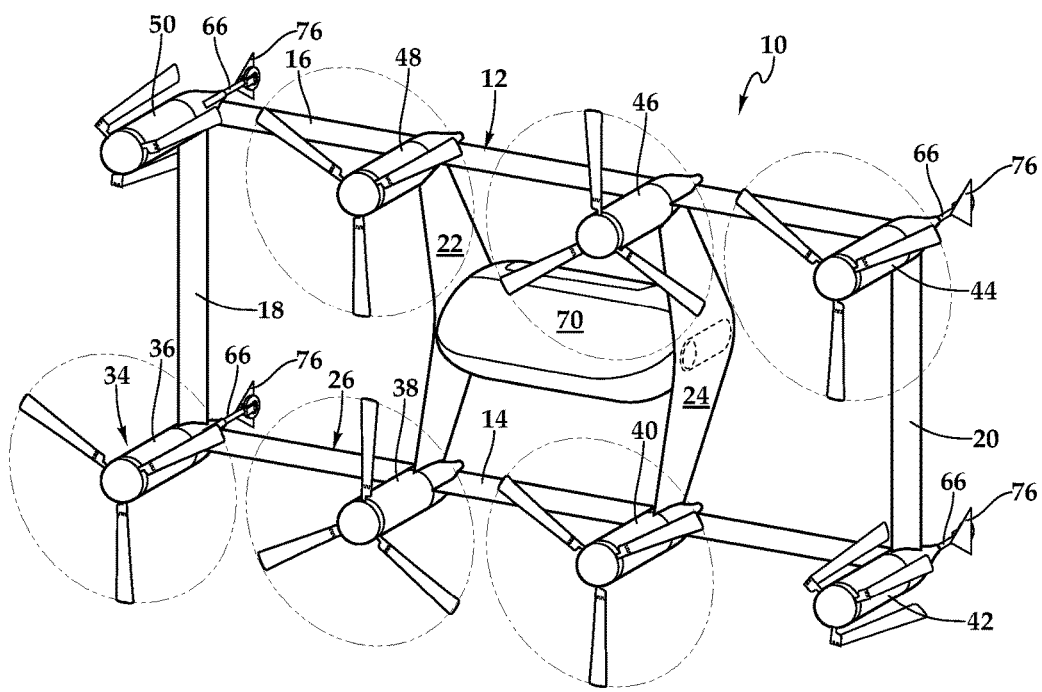

Use of distributed propulsion system 34 operated by flight control system 68 of the present disclosure provides unique advantages to the safety and reliability of aircraft 10 during flight. For example, as best seen in FIG. 2D, in the event of flight control system 68 detecting a fault with one of the propulsion assemblies during flight, flight control system 68 is operable to perform corrective action responsive to the detected fault at a distributed propulsion system level. In the illustrated embodiment, flight control system 68 has detected a fault in propulsion assembly 50 based upon information received from sensors within the electronics node of propulsion system 50. As a first step, flight control system 68 has shut down propulsion assembly 50, as indicated by the proprotor motion circle being removed in FIG. 2D. In addition, flight control system 68 now determines what other corrective measures should be implemented. For example, flight control system 68 may determine that certain operational changes to the currently operating propulsion assemblies 36, 42, 44 are appropriate, such as making adjustments in collective pitch, cyclic pitch, rotor speed and/or thrust vector of one or more of propulsion assemblies 36, 42, 44. Alternatively or additionally, flight control system 68 may determined that it is necessary or appropriate to reengage one or more of the previously shut down propulsion assemblies 38, 40, 46, 48, as best seen in FIG. 2E. Once the additional propulsion assemblies 38, 40, 46, 48 are operating, it may be desirable to shut down one or more of propulsion assemblies 36, 42, 44. For example, as best seen in FIG. 2E, flight control system 68 has shut down propulsion assembly 42 that is symmetrically disposed on airframe 12 relative to propulsion assembly 50, which may improve the stability of aircraft 10 during continued forward flight as well as in hover and vertical landing. As illustrated by this example, distributed propulsion system 34 operated by flight control system 68 provides numerous and redundant paths to maintain the airworthiness of aircraft 10, even when a fault occurs within distributed propulsion system 34.

In addition to taking corrective action at the distributed propulsion system level responsive to the detected fault, flight control system 68 is also operable to change the flight plan of aircraft 10 responsive to a detected fault. For example, based upon factors including the extent of the fault, weather conditions, the type and criticality of the mission, distance from waypoints and the like, flight control system 68 may command aircraft 10 to travel to a predetermined location, to perform an emergency landing or to continue the current mission. During missions including passenger pod assembly 70, flight control system 68 may initiates a pod assembly jettison sequence, as discussed herein, in which case, flight control system 68 may command aircraft 10 to land proximate to pod assembly 70 or perform an emergency landing remote from pod assembly 70. As illustrated by this example, distributed propulsion system 34 operated by flight control system 68 provides unique safety advantages for passengers and crew of aircraft 10, even when a fault occurs within distributed propulsion system 34.

Figure 3B:
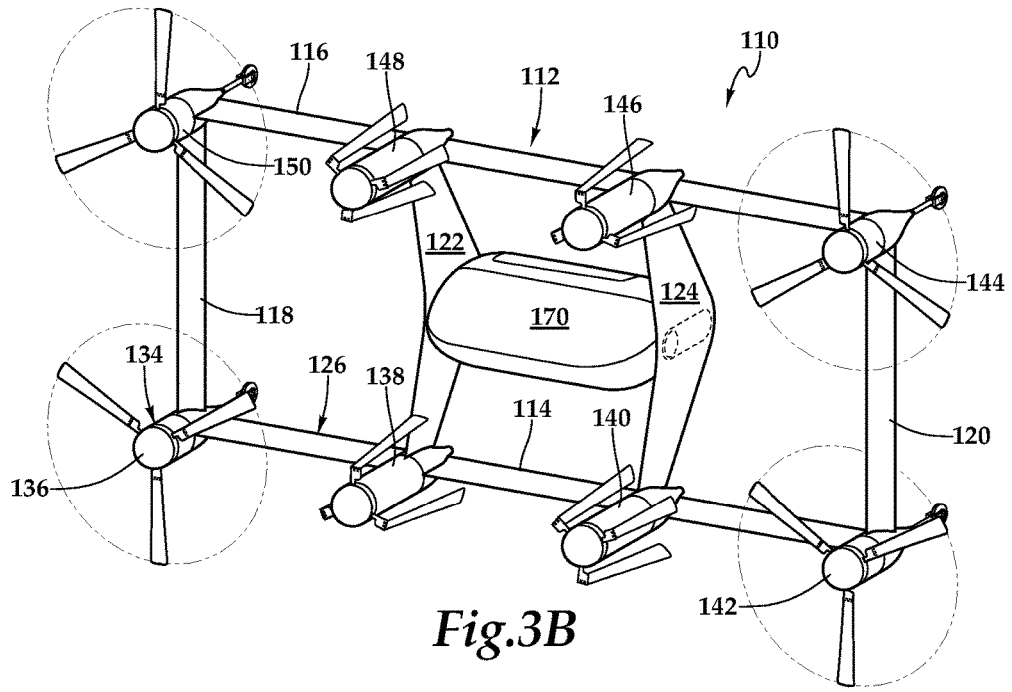
FIGS. 3A-3B are schematic illustrations of an aircraft in accordance with embodiments of the present disclosure.
Figure 3A:
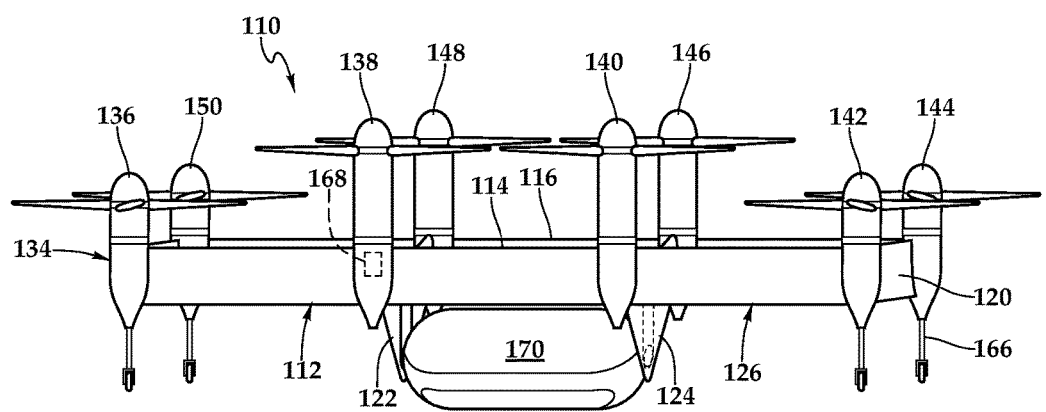

Referring to FIGS. 3A-3B in the drawings, various views of aircraft 110 are depicted. In the illustrated embodiment, aircraft 110 including a flying frame 112 having wing members 114, 116, outboard pylons 118, 120 and inboard pylons 122, 124 forming airframe 126. Flying frame 112 also includes a distributed propulsion system 134 depicted as eight independent propulsion assemblies 136, 138, 140, 142, 144, 146, 148, 150. Landing struts 166 telescopically extend from propulsion assemblies 136, 142, 144, 150. Flying frame 112 includes a flight control system 168 that is disposed with the nacelle of propulsion assembly 138 that communicates with the electronics nodes of each propulsion assembly 136, 138, 140, 142, 144, 146, 148, 150 receiving sensor data from and sending flight command information to the electronics nodes, thereby individually and independently controlling and operating each propulsion assembly 136, 138, 140, 142, 144, 146, 148, 150. In the illustrated embodiment, aircraft 110 includes a pod assembly, illustrated as passenger pod assembly 170, that is selectively attachable to flying frame 112 between inboard pylons 122, 124.

As best seen in FIG. 3A, aircraft 110 is in a vertical takeoff and landing mode after liftoff from a surface. Wing members 114, 116 are above pod assembly 170 with wing member 114 forward of and wing member 116 aft of pod assembly 170 and with wing members 114, 116 disposed in generally the same horizontal plane. As the thrust requirement for vertical takeoff and hovering is high, all propulsion assemblies 136, 138, 140, 142, 144, 146, 148, 150 are operating to generate vertical thrust. As best seen in FIG. 3B, aircraft 110 is in a forward flight mode. Wing members 114, 116 are generally forward of pod assembly 170 with wing member 114 below and wing member 116 above pod assembly 170 and with wing members 114, 116 disposed in generally the same vertical plane. As the thrust requirement for forward flight is reduced compared to vertical takeoff and landing, outboard propulsion assemblies 136, 142, 144, 150 are operating while inboard propulsion assemblies 138, 140, 146, 148 have been shut down. In the illustrated embodiment, the proprotors blades of inboard propulsion assemblies 138, 140, 146, 148 have folded to reduce air resistance and improve endurance. Preferably, the proprotors blades fold passively when propulsion assemblies 138, 140, 146, 148 are shut down, and then extend upon reengagement of propulsion assemblies 138, 140, 146, 148. In the illustrated embodiment, the nacelles of inboard propulsion assemblies 138, 140, 146, 148 are longer than the nacelles of outboard propulsion assemblies 136, 142, 144, 150 to provide sufficient length for the proprotors blades to fold. As the proprotors blades of outboard propulsion assemblies 136, 142, 144, 150 are not required to fold during flight, the modular propulsion assembly system allows shorter nacelles to be installed, which may improve the stability of aircraft 110 in forward flight.

Figure 4A:
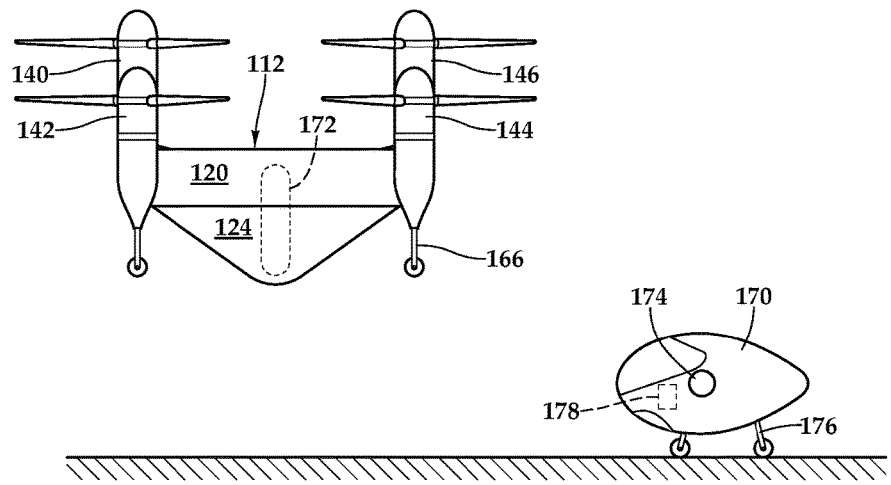
FIGS. 4A-4S are schematic illustrations of an aircraft in a sequential flight operating scenario in accordance with embodiments of the present disclosure.
Figure 4B:
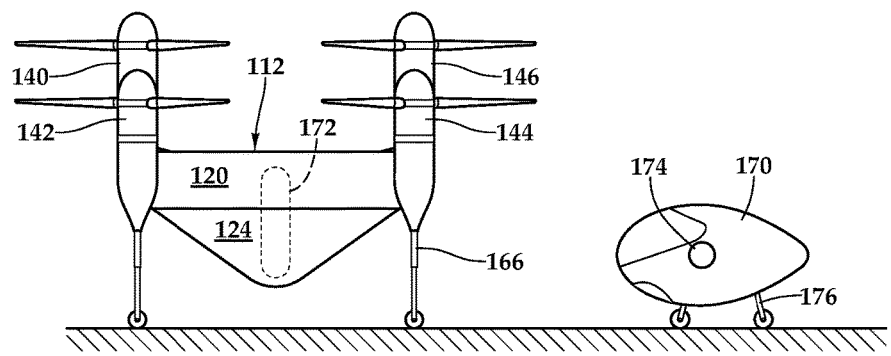
Figure 4C:
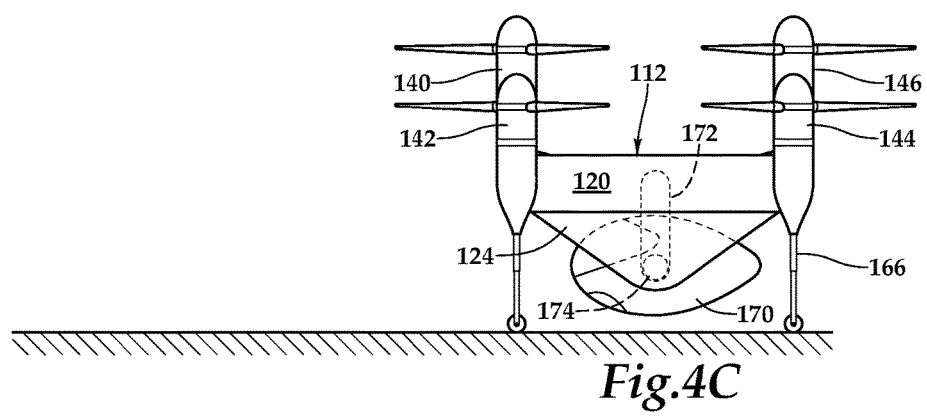
Figure 4Q:
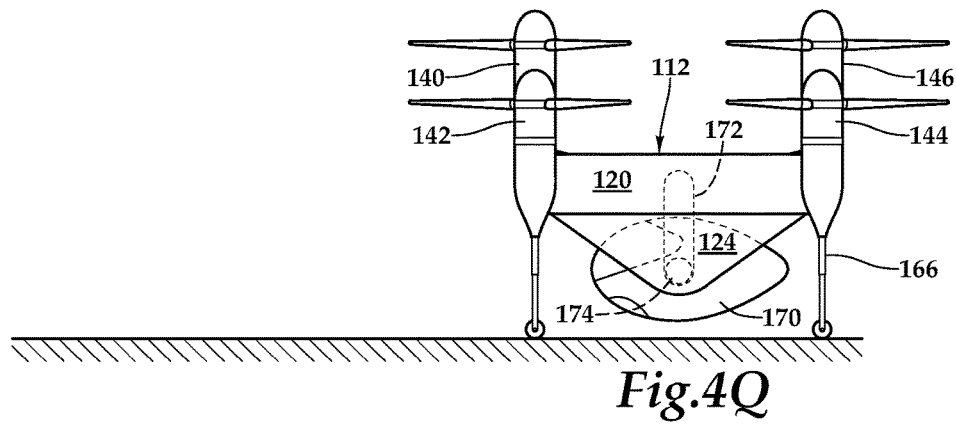
Figure 4R:
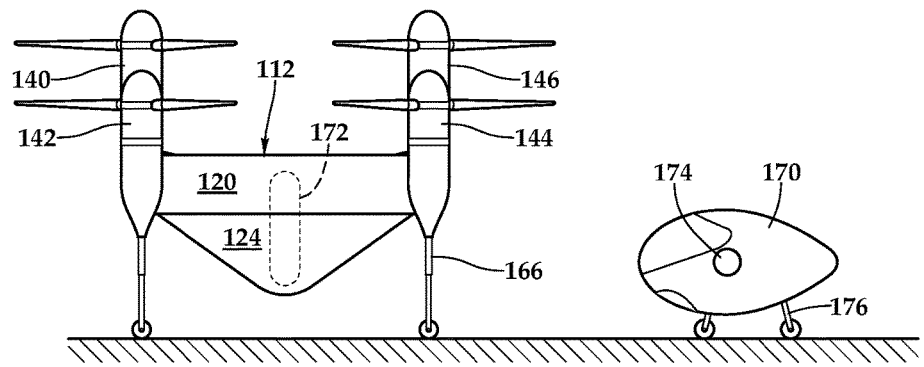
Figure 4S:
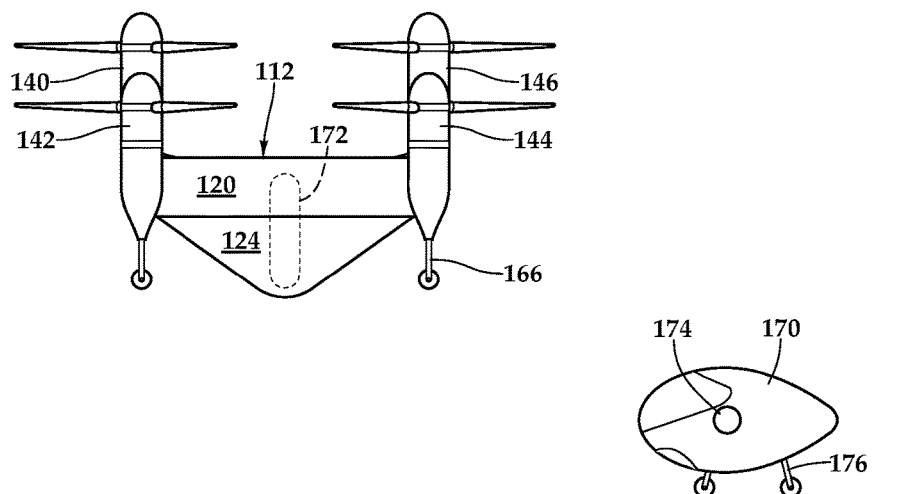

Referring next to FIGS. 4A-4S in the drawings, a sequential flight-operating scenario of flying frame 112 is depicted. As discussed herein, passenger pod assembly 170 is selectively attachable to flying frame 112 such that a single flying frame can be operably coupled to and decoupled from numerous passenger pod assemblies for numerous missions over time. As best seen in FIG. 4A, pod assembly 170 is positioned on a surface at a current location such as at the home of a pod assembly owner, at a business utilizing pod assembly transportation, in a military theater, on the flight deck of an aircraft carrier or other location. In the illustrated embodiment, pod assembly 170 includes retractable wheel assemblies 176 that enable ground transportation of pod assembly 170. As illustrated, flying frame 112 is currently in a landing pattern near pod assembly 170 in its vertical takeoff and landing mode with all propulsion assemblies operating. For example, flying frame 112 may have been dispatched from a transportation services provider to retrieve and transport pod assembly 170 from the current location to a destination. Flying frame 112 may be operated responsive to autonomous flight control based upon a flight plan preprogrammed into flight control system 168 of flying frame 112 or may be operated responsive to remote flight control, receiving, for example, flight commands from a transportation services provider operator. In either case, flying frame 112 is operable to identify the current location of pod assembly 170 using, for example, global positioning system information or other location based system information including location information generated by electronics node 178 of pod assembly 170.

As best seen in FIG. 4B, flying frame 112 has landed proximate pod assembly 170. Preferably, flying frame 112 taxis to a position above pod assembly 170 and engages joint members 174 of pod assembly 170 with receiving assemblies 172 to create a mechanical coupling and a communication channel therebetween. Alternatively, flying frame 112 may make a vertical approach directly to pod assembly 170 prior to attachment with pod assembly 170. As best seen in FIG. 4C, pod assembly 170 now retracts wheel assemblies 176 and is fully supported by flying frame 112. Once pod assembly 170 is attached to flying frame 112, the flight control system of flying frame 112 may be responsive to autonomous flight control, remote flight control, onboard pilot flight control or any combination thereof. For example, it may be desirable to utilize onboard pilot flight control of a pilot within pod assembly 170 during certain maneuvers such at takeoff and landing but rely on remote or autonomous flight control during periods of forward flight. Regardless of the flight control mode chosen, flying frame 112 is now ready to lift pod assembly 170 into the air. As best seen in FIG. 4D, flying frame 112 is in its vertical takeoff and landing mode with all propulsion assemblies operating and flying frame 112 has lifted pod assembly 170 into the air. Flying frame 112 continues its vertical assent to a desired elevation and may now begin the transition from vertical takeoff and landing mode to forward flight mode.

As best seen in FIGS. 4D-4G, as flying frame 112 transitions from vertical takeoff and landing mode to forward flight mode, flying frame 112 rotates about pod assembly 170 such that pod assembly 170 is maintained in a generally horizontal attitude for the safety and comfort of passengers, crew and/or cargo carried in pod assembly 170. This is enabled by a passive and/or active connection between receiving assemblies 172 of flying frame 112 and joint members 174 of pod assembly 170. For example, a gimbal assembly may be utilized to allow passive orientation of pod assembly 170 relative to flying frame 112. This may be achieved due to the shape and the center of gravity of pod assembly 170 wherein aerodynamic forces and gravity tend to bias pod assembly 170 toward the generally horizontal attitude. Alternatively or additionally, a gear assembly, a clutch assembly or other suitably controllable rotating assembly may be utilized that allows for pilot controlled, remote controlled or autonomously controlled rotation of pod assembly 170 relative to flying frame 112 as flying frame 112 transitions from vertical takeoff and landing mode to forward flight mode.

As best seen in FIGS. 4G-4I, once flying frame 112 has completed the transition to forward flight mode, it may be desirable to adjust the center of gravity of the aircraft to improve its stability and efficiency. In the illustrated embodiment, this can be achieved by shifting pod assembly 170 forward relative to flying frame 112 using an active connection between receiving assemblies 172 of flying frame 112 and joint members 174 of pod assembly 170. For example, rotation of a gear assembly of pod assembly 170 relative to a rack assembly of flying frame 112 or other suitable translation system may be used to shift pod assembly 170 forward relative to flying frame 112 under pilot control, remote control or autonomous control. Once pod assembly 170 is in the desired forward position relative to flying frame 112, certain propulsion assemblies of flying frame 112 may be shut down as the thrust requirements in forward flight mode are reduced compared to the thrust requirements of vertical takeoff and landing mode. For example, the inboard propulsion assemblies of flying frame 112 may be shut down which allows the proprotor blades to passively fold increasing efficiency in forward flight, as best seen in FIG. 4J.

When flying frame 112 begins its approaches to the destination, inboard propulsion assemblies of flying frame 112 are reengaged to provide full propulsion capabilities, as best seen in FIG. 4K. Pod assembly 170 is preferably returned to the aft position relative to flying frame 112, as best seen in FIGS. 4K-4M. Once pod assembly 170 has returned to the desired aft position, flying frame 170 can begin its transition from forward flight mode to vertical takeoff and landing mode. As best seen in FIGS. 4M-4P, during the transition from forward flight mode to vertical takeoff and landing mode, flying frame 112 rotates about pod assembly 170 such that pod assembly 170 is maintained in the generally horizontal attitude for the safety and comfort of passengers, crew and/or cargo carried in pod assembly 170. Once flying frame 112 has completed the transition to vertical takeoff and landing mode, flying frame 112 may complete its descent to a surface, as best seen in FIG. 4Q. Pod assembly 170 may now lower wheel assemblies 176 to provide ground support to pod assembly 170 allowing flying frame 112 to decouple from pod assembly 170 and taxi away, as best seen in FIG. 4R. After transporting and releasing pod assembly 170 at the destination, flying frame 112 may depart from the destination for another location, as best seen in FIG. 4S, such as the transportation services provider hub.

Figure 5C:
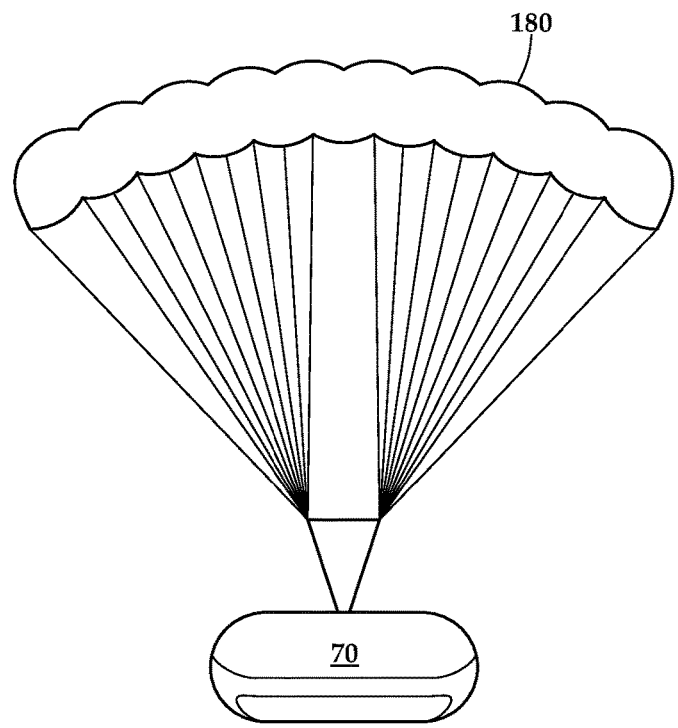

Referring to FIGS. 5A-5D in the drawings, a sequential flight-operating scenario of flying frame 112 is depicted. During a manned mission, in the event of an emergency, or during a cargo drop mission, for example, flying frame 112 is operable to jettison an attached pod assembly. In the illustrated embodiment, passenger pod assembly 170 is attached to flying frame 112, as best seen in FIG. 5A. If, for example, sensors on board flying frame 112 indicate a critical condition relating to the continued operability of flying frame 112, the flight control system, based upon onboard pilot commands, remote commands and/or autonomous commands, can initiate a pod assembly jettison sequence. In accordance with the jettison command, receiving assemblies 172 of flying frame 112 release joint members 174 of pod assembly 170 and pod assembly 170 deploys a parachute 180, as best seen in FIG. 5B. Preferably, as best seen in FIG. 5C, parachute 180 is a parafoil parachute having an aerodynamic cell structure that is inflated responsive to incoming air flow that provides both steerability and a controlled rate of descent to minimize the landing impact pod assembly 170 on a surface or in the water, in which case, pod assembly 170 is preferably watertight.

Figure 5D:
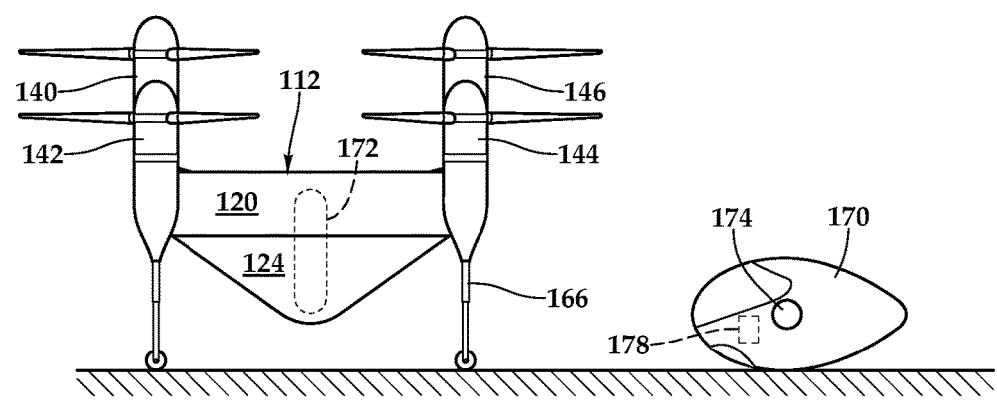

Continuing with the example of a critical condition on board flying frame 112 and in the event that flying frame 112 is unable to continue flight even after pod assembly 170 has been jettisoned, flying frame 112 along with its fuel supply will likely land remote from pod assembly 170, thus minimizing the risk to passengers and/or crew of pod assembly 170 to fire and/or other hazards. Once pod assembly 170 has been jettisoned, however, the reduction in weight may enable flying frame 112 to continue flight and perform a controlled descent and landing. In this case, flying frame 112 may be preprogrammed to return to a home base, such as the transportation services provider hub, or commanded in real-time to fly to a safe location determined by a remote operator or autonomously by the flight control system. Preferably, the safe location is proximate the landing location of pod assembly 170 which is determined based upon location information generated by electronics node 178 of pod assembly 170, as best seen in FIG. 5D.

Figure 6A:
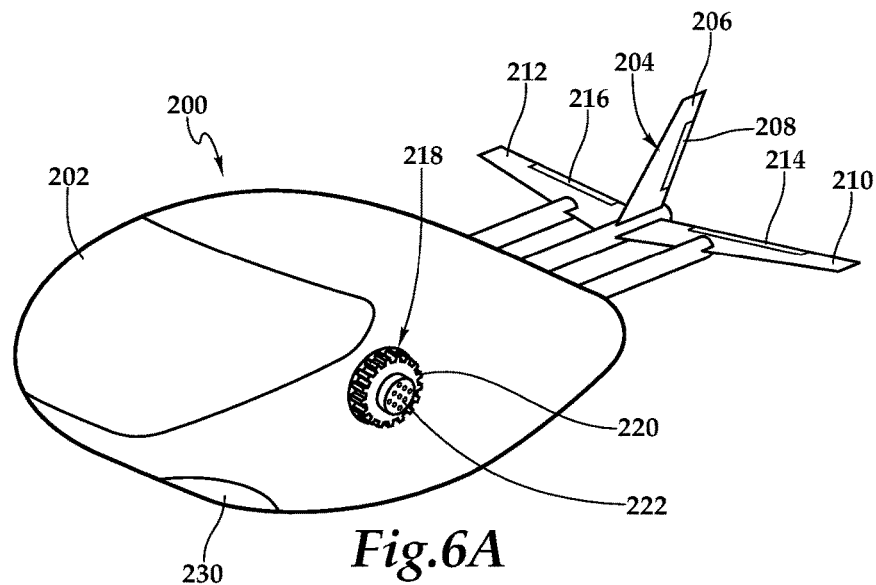
FIGS. 6A-6B are schematic illustrations of a passenger pod assembly for an aircraft in accordance with embodiments of the present disclosure.
Figure 6B:
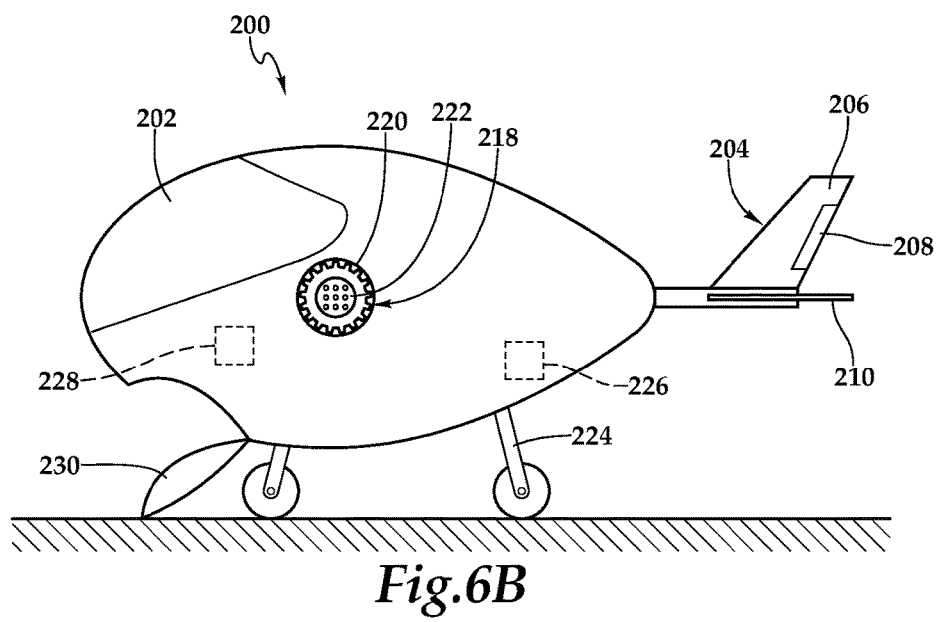

Referring to FIGS. 6A-6B in the drawings, a passenger pod assembly 200 is depicted. Passenger pod assembly 200 is operable to be selectively attached to a flying frame as discussed herein with reference to pod assemblies 70, 170. In the illustrated embodiment, passenger pod assembly 200 has a generally transparent panel 202 that enables passenger and/or crew inside passenger pod assembly 200 to see outside of passenger pod assembly 200. In addition, passenger pod assembly 200 includes a tail assembly 204 depicted as having a vertical stabilizer 206 with a rudder 208 and horizontal stabilizers 210, 212 including elevators 214, 216. Tail assembly 204 may operate in passive mode to bias passenger pod assembly 200 to the generally horizontal attitude as discussed herein or may be operated actively via direct onboard pilot operation or responsive to commands from the flight control system of a flying frame to which passenger pod assembly 200 is attached.

Passenger pod assembly 200 includes a pair of oppositely disposed joint members 218, only one being visible in the figure, depicted as a gear assembly 220 and a communications port assembly 222. Gear assembly 220 is operable to form a mechanical connection with a receiving assembly of a flying frame and is preferably operable to allow relative rotation and translation therebetween as discussed herein. Communications port assembly 222 is operable to be directly coupled to a mating communications pin assembly of a flying frame to establish a communication channel therebetween. Alternatively or additional, one or more wiring harnesses may be connected between passenger pod assembly 200 and a flying frame including, for example, one or more quick disconnect wiring harnesses. As illustrated, passenger pod assembly 200 includes retractable wheel assemblies 224 that enable ground transportation of passenger pod assembly 200. Preferably, passenger pod assembly 200 includes a power supply illustrated as battery 226 that is operable to power electronics node 228, enable ground transportation via wheel assemblies 224 and operate tail assembly 204. Alternatively or additionally, passenger pod assembly 200 may include a liquid fuel engine for providing mechanical power to passenger pod assembly 200.

Electronics node 228 of passenger pod assembly 200 preferably includes a non-transitory computer readable storage medium including a set of computer instructions executable by a processor for operating passenger pod assembly 200 and communicating with a flying frame For example, electronics node 228 may include a general-purpose computer, a special purpose computer or other machine with memory and processing capability. Electronics node 228 may be a microprocessor-based system operable to execute program code in the form of machine-executable instructions. In addition, electronics node 228 may be connectable to other computer systems via a proprietary encrypted network, a public encrypted network, the Internet or other suitable communication network that may include both wired and wireless connections.

Electronics node 228 preferably includes a display device configured to display information to an onboard pilot. The display device may be configured in any suitable form, including, for example, as one or more display screens such as liquid crystal displays, light emitting diode displays and the like or any other suitable display type including, for example, a display panel or dashboard display. Electronics node 228 may also include audio output and input devices such as a microphone, speakers and/or an audio port allowing an onboard pilot to communicate with, for example, an operator at a transportation services provider facility. The display device may also serve as a user interface device if a touch screen display implementation is used, however, other user interface devices may alternatively be used to allow an onboard pilot to control passenger pod assembly 200 as well as a flying frame being operated responsive to onboard pilot control including, for example, a control panel, mechanical control devices or other control devices. Electronics node 228 preferably includes a global positioning system interface or other location system enabling passenger pod assembly 200 to know its location and to transmit its location to a flying frame as discussed herein.

As illustrated, passenger pod assembly 200 includes a clamshell type access hatch 230 that enables passengers and/or crew to enter and exit passenger pod assembly 200. Access hatch 230 may also be configured to enable vehicles such as cars, truck or light infantry vehicles to enter and exit passenger pod assembly 200. Likewise, access hatch 230 may be configured to enable loading and unloading of cargo using lift trucks or other cargo transportation vehicles.

Figure 7B:
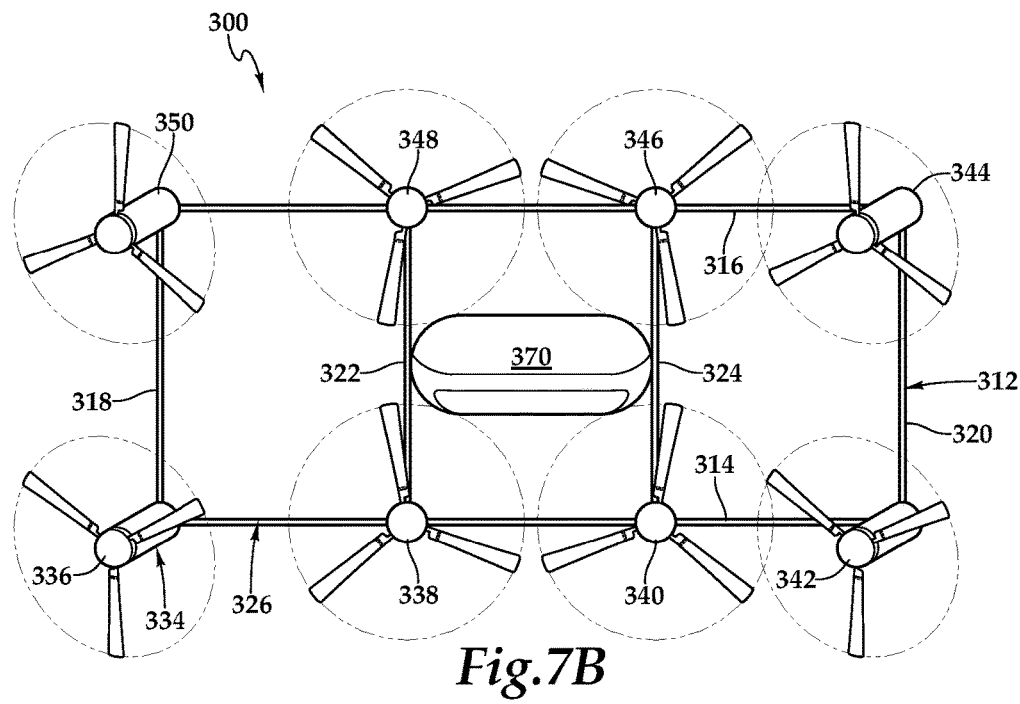
Figure 7A:
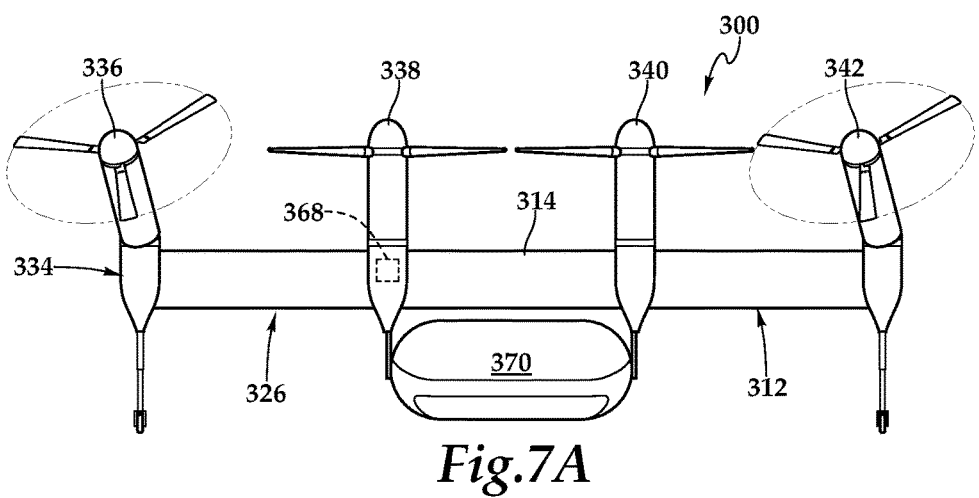

Referring to FIGS. 7A-7C in the drawings, various views of aircraft 300 are depicted. In the illustrated embodiment, aircraft 300 including a flying frame 312 having wing members 314, 316, outboard pylons 318, 320 and inboard pylons 322, 324 forming airframe 326. Flying frame 312 also includes a distributed propulsion system 334 depicted as eight independent propulsion assemblies 336, 338, 340, 342, 344, 346, 348, 350. Landing struts 366 telescopically extend from propulsion assemblies 336, 342, 344, 350. Flying frame 312 includes a flight control system 368 that is disposed with the nacelle of propulsion assembly 338 that communicates with the electronics nodes of each propulsion assembly 336, 338, 340, 342, 344, 346, 348, 350 receiving sensor data from and sending flight command information to the electronics nodes, thereby individually and independently controlling and operating each propulsion assembly 336, 338, 340, 342, 344, 346, 348, 350. In the illustrated embodiment, aircraft 310 includes a pod assembly, illustrated as passenger pod assembly 370, that is selectively attachable to flying frame 312 between inboard pylons 322, 324. As best seen in FIG. 7A, aircraft 300 has a vertical takeoff and landing mode and, as best seen in FIG. 7B, aircraft 300 has a forward flight mode, wherein transitions therebetween may take place as described herein with reference to flying frames 12, 112.

As airframe 326 creates a relatively large surface area for crosswinds during vertical takeoff and landing and during hovering, flight control system 368 is operable to individually and independently control the thrust vector of the outboard propulsion assembly 336, 342, 344, 350. As best seen in FIG. 7C, each propulsion assembly 336, 338, 340, 342, 344, 346, 348, 350, such as propulsion assembly 344 includes a nacelle 352, one or more fuel tanks 354, an engine 356, a drive system 358, a rotor hub 360, a proprotor 362 and an electronics node 364. It is noted that fuel tanks 354 may not be required in propulsion assemblies having electric or hydraulic engines as discussed herein. Each outboard propulsion assembly 336, 342, 344, 350, such as propulsion assembly 344 includes a thrust vectoring system depicted as a dual actuated thrust vectoring control assembly 372. As illustrated, engine 356, drive system 358, rotor hub 360 and proprotor 362 are mounted to a pivotable plate 374 operable to pivot about a pivot axis defined by pin 376. Pivotable plate 374 is also operable to rotate about the mast centerline axis 378 to control the azimuth within the thrust vectoring system. In the illustrated embodiment, rotation of pivotable plate 374 is accomplished with an electromechanical rotary actuator 380 but other suitable rotary actuator could alternatively be used. The elevation of pivotable plate 374 is controlled with a linear actuator 382 that pulls and/or pushes pivotable plate 374 about the pivot axis. In the illustrated embodiment, the maximum pitch angle 384 of the thrust vector 386 is about 20 degrees. Accordingly, it should be understood by those skilled in the art that the thrust vector may be resolved to any position within the 20-degree cone swung about mast centerline axis 378. The use of a 20-degree pitch angle yields a lateral component of thrust that is about 34 percent of total thrust, which provides suitable lateral thrust to manage standard operating wind conditions. The thrust vectoring of each of the outboard propulsion assembly 336, 342, 344, 350 is independently controlled by flight control system 368. This enables differential yaw control during hover, as well as an unlimited combination of differential coupled with net lateral thrust to allow positioning over a stationary target while crosswinds are present. Even though a particular thrust vectoring system having a particular maximum pitch angle has been depicted and described, it will be understood by those skilled in the art that other thrust vectoring systems, such as a gimbaling system, having other maximum pitch angles, either greater than or less than 20 degrees, may alternatively be used on flying frames of the present disclosure.

Figure 8:
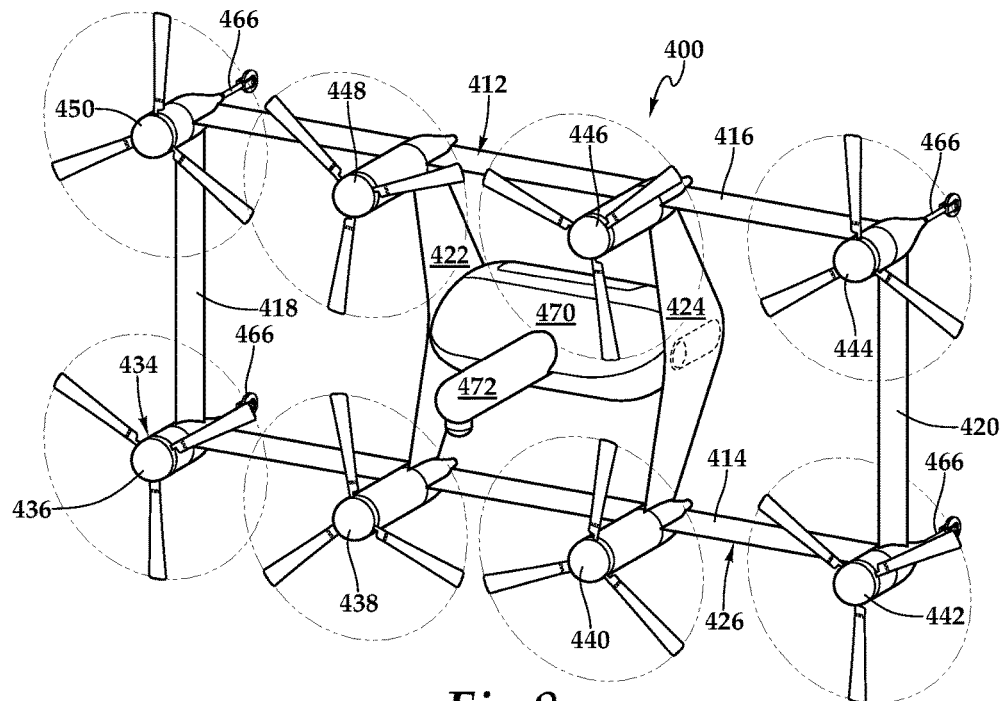
FIG. 8 is a schematic illustration of an aircraft in accordance with embodiments of the present disclosure.

Referring to FIG. 8 in the drawings, an aircraft 400 is depicted. In the illustrated embodiment, aircraft 400 including a flying frame 412 having wing members 414, 416, outboard pylons 418, 420 and inboard pylons 422, 424 forming airframe 426. Flying frame 412 also includes a distributed propulsion system 434 depicted as eight independent propulsion assemblies 436, 438, 440, 442, 444, 446, 448, 450. Landing struts 466 telescopically extend from propulsion assemblies 436, 442, 444, 450. Flying frame 412 includes a flight control system that may be disposed within a nacelle of distributed propulsion system 434 that communicates with the electronics nodes of each propulsion assembly 436, 438, 440, 442, 444, 446, 448, 450 receiving sensor data from and sending flight command information to the electronics nodes, thereby individually and independently controlling and operating each propulsion assembly 436, 438, 440, 442, 444, 446, 448, 450. Aircraft 400 has a vertical takeoff and landing mode and a forward flight mode as described herein. In the illustrated embodiment, aircraft 400 includes a pod assembly, illustrated as a surveillance pod assembly 470, that is selectively attachable to flying frame 412 between inboard pylons 422, 424. Surveillance pod assembly 470 may be operable for aerial observations and data gathering relating to military and civilian operations using a sensor array 472. Surveillance pod assembly 470 may store data obtained from sensor array 472 in an onboard memory and/or wirelessly send data to a remote system for review and analysis thereof. In military operation, surveillance pod assembly 470 or a similar pod assembly may carry a weapons package operable to launch weapons at military targets.

Figure 9:
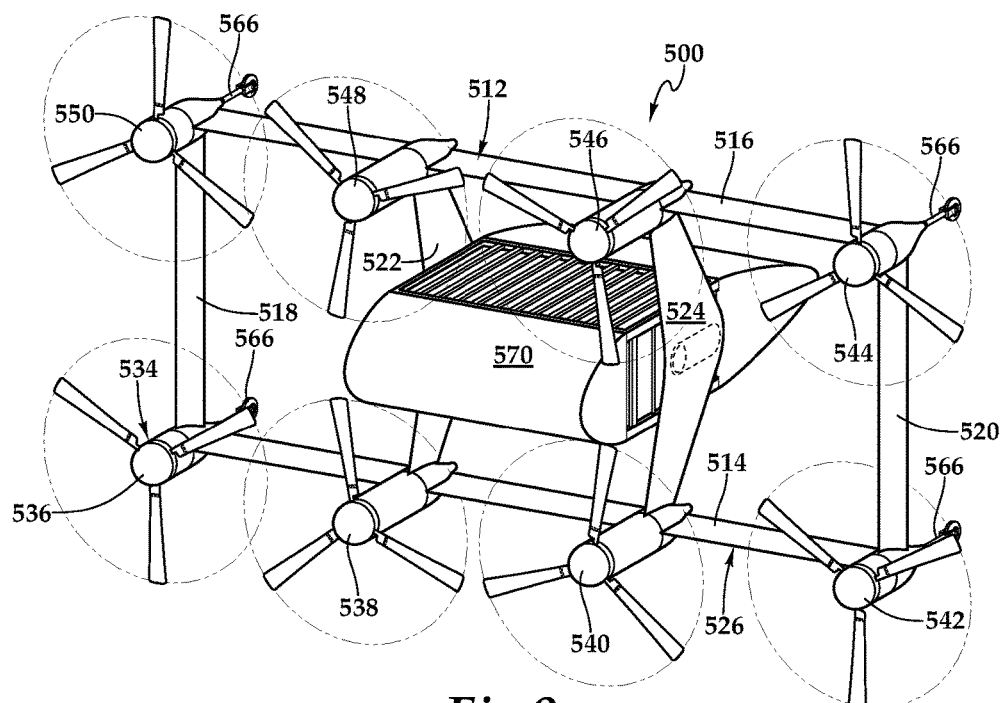
FIG. 9 is a schematic illustration of an aircraft in accordance with embodiments of the present disclosure.

Referring to FIG. 9 in the drawings, an aircraft 500 is depicted. In the illustrated embodiment, aircraft 500 including a flying frame 512 having wing members 514, 516, outboard pylons 518, 520 and inboard pylons 522, 524 forming airframe 526. Flying frame 512 also includes a distributed propulsion system 534 depicted as eight independent propulsion assemblies 536, 538, 540, 542, 544, 546, 548, 550. Landing struts 566 telescopically extend from propulsion assemblies 536, 542, 544, 550. Flying frame 512 includes a flight control system that may be disposed within a nacelle of distributed propulsion system 534 that communicates electronics nodes of each propulsion assembly 536, 538, 540, 542, 544, 546, 548, 550 receiving sensor data from and sending flight command information to the electronics nodes, thereby individually and independently controlling and operating each propulsion assembly 536, 538, 540, 542, 544, 546, 548, 550. Aircraft 500 has a vertical takeoff and landing mode and a forward flight mode as described herein. In the illustrated embodiment, aircraft 500 includes a pod assembly, illustrated as a cargo container pod assembly 570 having selectively attachable aerodynamic fairing forming leading and trailing edges thereof. Cargo container pod assembly 570 may be of a standard size operable additional transportation by truck, by rail and by ship. Cargo container pod assembly 570, however, may alternatively be a specially designed cargo container for use with flying frame 512 or for transporting a specific type of cargo. Also, as discussed herein, flying frame 512 and cargo container pod assembly 570 may be used in cargo drop missions to provide food, water and other critical items to remote regions during a natural disaster recovery mission or to provide weapons or other military hardware to personnel in a military theater.

Figure 10:
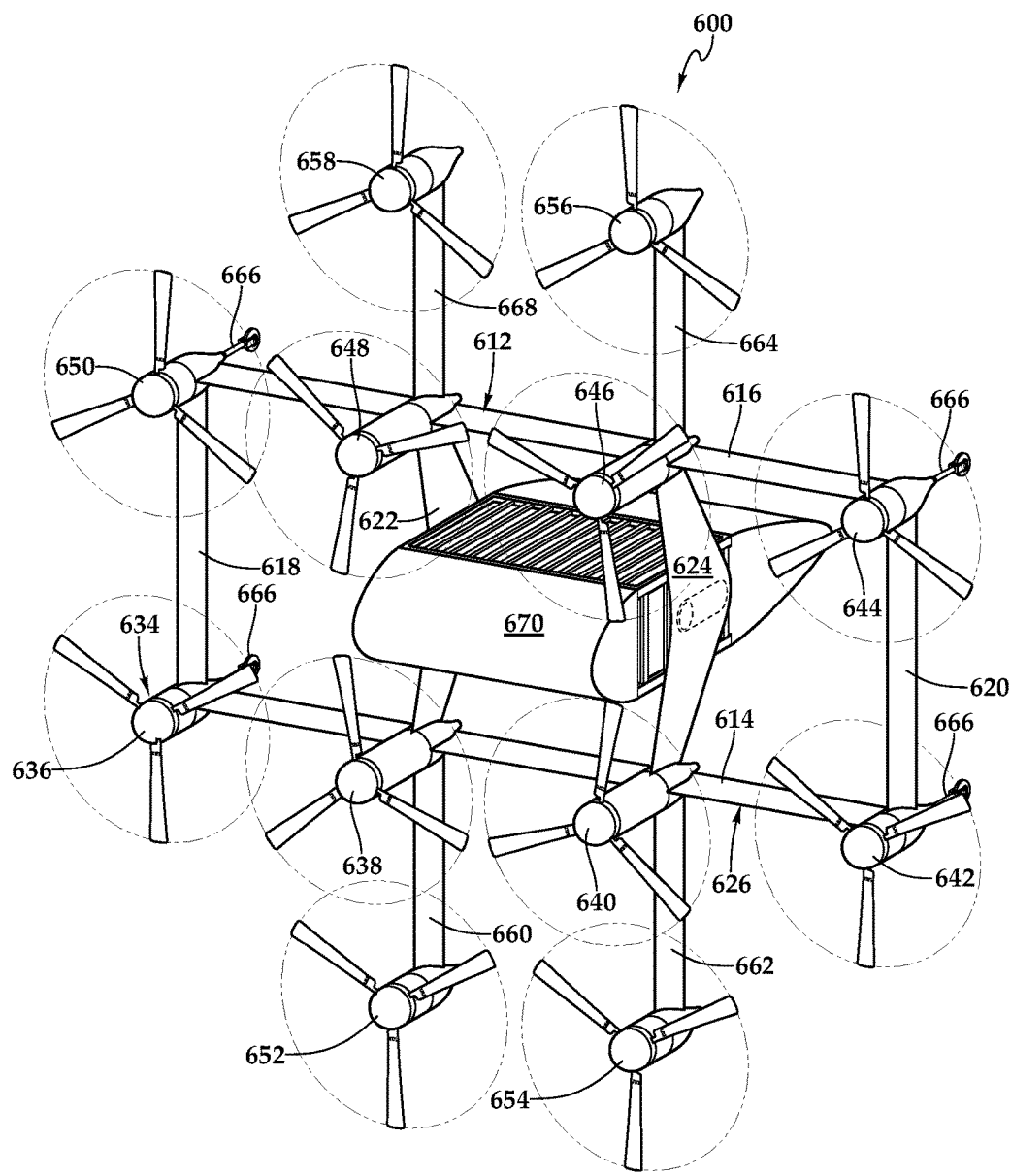
FIG. 10 is a schematic illustration of an aircraft in accordance with embodiments of the present disclosure.

As should be apparent to those skilled in the art, the aircraft of the present disclosure are versatile and may be used during a variety of missions. The modular design of the aircraft of the present disclosure further adds to the capabilities of these aircraft. For example, referring to FIG. 10 in the drawings, an aircraft 600 is depicted that is suitable for lifting and transporting heavy loads. In the illustrated embodiment, aircraft 600 including a flying frame 612 having wing members 614, 616, outboard pylons 618, 620 and inboard pylons 622, 624 forming airframe 626. Flying frame 612 also includes a distributed propulsion system 634 depicted as eight primary propulsion assemblies 636, 638, 640, 642, 644, 646, 648, 650 and four booster or supplemental propulsion assemblies 652, 654, 656, 658. Landing struts 666 telescopically extend from propulsion assemblies 636, 642, 644, 650. Flying frame 612 includes a flight control system that may be disposed within a nacelle of distributed propulsion system 634 that communicates electronics nodes of each primary and supplemental propulsion assembly receiving sensor data from and sending flight command information to the electronics nodes, thereby individually and independently controlling and operating each propulsion assembly. Aircraft 600 has a vertical takeoff and landing mode and a forward flight mode as described herein. In the illustrated embodiment, aircraft 600 includes a pod assembly, illustrated as a cargo pod assembly 670 having selectively attachable aerodynamic fairing forming leading and trailing edges thereof.

As illustrated, supplemental propulsion assemblies 652, 654, 656, 658 are attached to flying frame 612 with connection assemblies depicted as outboard support members that are securably attached to the inboard propulsion assemblies and/or wings 614, 616 by bolting or other suitable technique, thereby forming a booster propulsion system. More specifically, outboard support member 660 connects supplemental propulsion assembly 652 to primary propulsion assembly 638, outboard support member 662 connects supplemental propulsion assembly 654 to primary propulsion assembly 640, outboard support member 664 connects supplemental propulsion assembly 656 to primary propulsion assembly 646 and outboard support member 668 connects supplemental propulsion assembly 658 to primary propulsion assembly 648. Outboard support members 660, 662, 664, 668 may include internal passageways for containing fuel lines that may be coupled to the fuel distribution network and communications lines that may be coupled to the communications network of flying frame 612. Alternatively, fuel lines and/or communications lines may be supported on the exterior of outboard support members 660, 662, 664, 668. In embodiments having self-contained fuel tanks within supplemental propulsion assemblies 652, 654, 656, 658, fuel lines may not be required. Even though a particular orientation of supplemental propulsion assemblies has been depicted and described, it should be understood by those skilled in the art that supplemental propulsion assemblies could be attached to a flying frame in other orientations including attaching one or two supplemental propulsion assemblies to one or more outboard primary propulsion assemblies. As should be apparent, the modular nature of the supplemental propulsion assemblies adds significant versatility to flying frames of the present disclosure.

Figure 11:
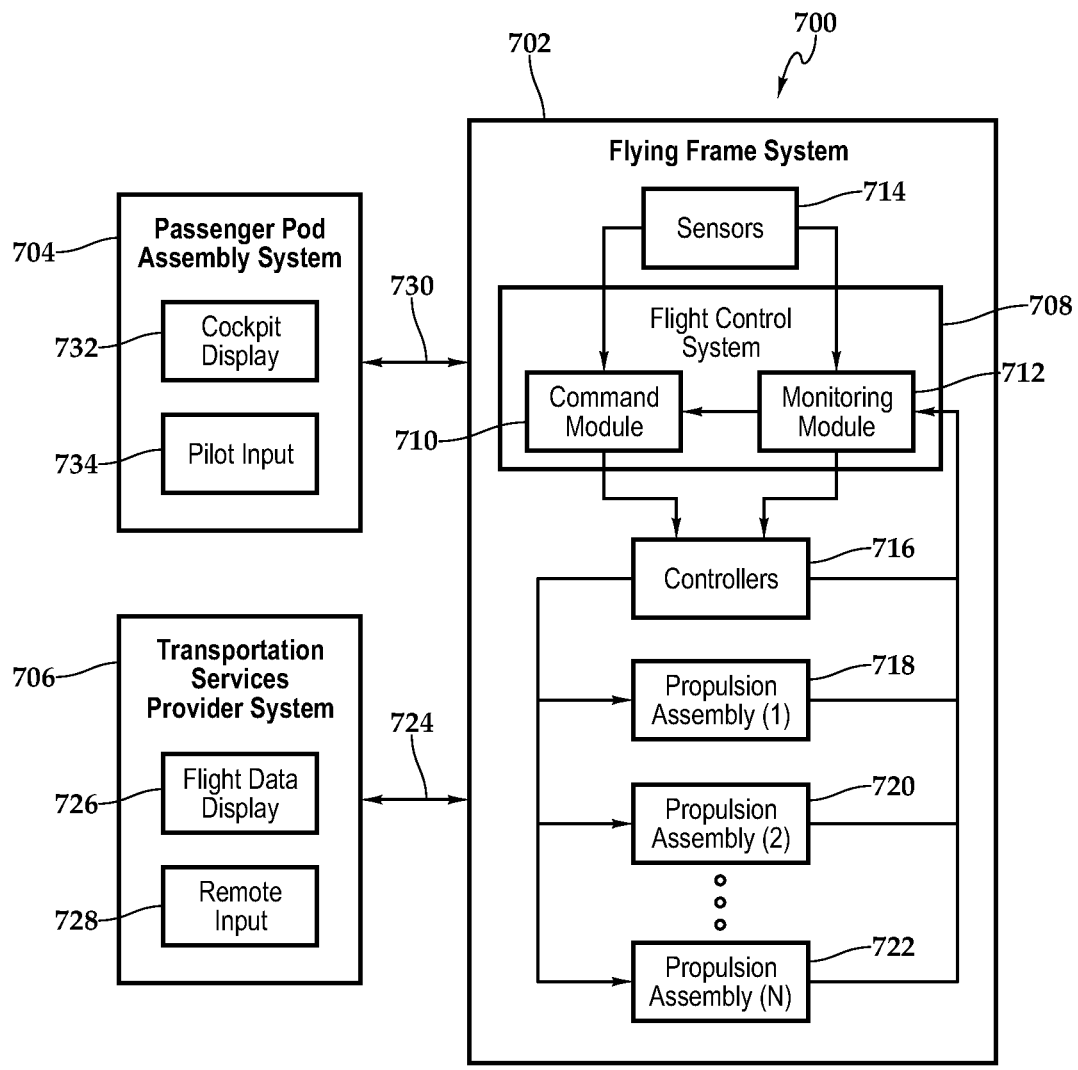
FIG. 11 is a block diagram of an aircraft control system in accordance with embodiments of the present disclosure.

Referring to FIG. 11 in the drawings, a block diagram depicts an aircraft control system 700 operable for use with flying frames of the present disclosure. In the illustrated embodiment, system 700 includes three primary computer based subsystems; namely, a flying frame system 702, a passenger pod assembly system 704 and a transportation services provider system 706. As discussed herein, the flying frames of the present disclosure may be operated autonomously responsive to commands generated by flight control system 708 that preferably includes a non-transitory computer readable storage medium including a set of computer instructions executable by a processor. Flight control system 708 may be implemented on a general-purpose computer, a special purpose computer or other machine with memory and processing capability. For example, flight control system 708 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 708 may be a microprocessor-based system operable to execute program code in the form of machine-executable instructions. In addition, flight control system 708 may be selectively connectable to other computer systems via a proprietary encrypted network, a public encrypted network, the Internet or other suitable communication network that may include both wired and wireless connections.

In the illustrated embodiment, flight control system 708 includes a command module 710 and a monitoring module 712. It is to be understood by those skilled in the art that these and other modules executed by flight control system 708 may be implemented in a variety of forms including hardware, software, firmware, special purpose processors and combinations thereof. Flight control system 708 receives input from a variety of sources including internal sources such as sensors 714, controllers 716, and propulsion assemblies 718-722 and as well as external sources such as passenger pod assembly system 704, transportation services provider system 706 as well as global positioning system satellite or other location positioning systems and the like. For example, flight control system 708 may receive a flight plan including starting and ending locations for a mission from passenger pod assembly system 704 and/or transportation services provider system 706. Thereafter, flight control system 708 is operable to autonomously control all aspects of flight of a flying frame of the present disclosure. For example, during the various operating modes of a flying frame including vertical takeoff and landing mode, hovering mode, forward flight mode and transitions therebetween, command module 710 provides commands to controllers 716. These commands enable independent operation of each propulsion assembly 718-722 including which propulsion assemblies should be operating, the pitch of each proprotor blade, to rotor speed of each propulsion assembly, the thrust vector of outboard propulsion assemblies and the like. These commands also enable a flying frame to couple with and decouple from a pod assembly, to transition between vertical takeoff and landing mode and forward flight mode while maintaining a pod assembly in a generally horizontal attitude and to jettison a pod assembly, as discussed herein. Flight control system 708 receives feedback from controllers 716 and each propulsion assembly 718-722. This feedback is processes by monitoring module 712 that can supply correction data and other information to command module 710 and/or controllers 716. Sensors 714, such as positioning sensors, attitude sensors, speed sensors, environmental sensors, fuel sensors, temperature sensors, location sensors and the like also provide information to flight control system 708 to further enhance autonomous control capabilities.

Some or all of the autonomous control capability of flight control system 708 can be augmented or supplanted by remote flight control from, for example, transportation services provider system 706. Transportation services provider system 706 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Transportation services provider system 706 communicates with flight control system 708 via a communication link 724 that may include both wired and wireless connections.

Transportation services provider system 706 preferably includes one or more flight data display devices 726 configured to display information relating to one or more flying frames of the present disclosure. Display devices 726 may be configured in any suitable form, including, for example, liquid crystal displays, light emitting diode displays, cathode ray tube displays or any suitable type of display. Transportation services provider system 706 may also include audio output and input devices such as a microphone, speakers and/or an audio port allowing an operator at a transportation services provider facility to communicate with, for example, a pilot on board a pod assembly. The display device 726 may also serve as a remote input device 728 if a touch screen display implementation is used, however, other remote input devices, such as a keyboard or joystick, may alternatively be used to allow an operator at a transportation services provider facility to provide control commands to a flying frame being operated responsive to remote control.

Some or all of the autonomous and/or remote flight control of a flying frame can be augmented or supplanted by onboard pilot flight control if the pod assembly coupled to a flying frame includes a passenger pod assembly system 704. Passenger pod assembly system 704 preferably includes a non-transitory computer readable storage medium including a set of computer instructions executable by a processor and may be implemented by a general-purpose computer, a special purpose computer or other machine with memory and processing capability. Passenger pod assembly system 704 may include one or more memory storage modules including, but is not limited to, internal storage memory such as random access memory, non-volatile memory such as read only memory, removable memory such as magnetic storage memory, optical storage memory, solid-state storage memory or other suitable memory storage entity. Passenger pod assembly system 704 may be a microprocessor-based system operable to execute program code in the form of machine-executable instructions. In addition, passenger pod assembly system 704 may be connectable to other computer systems via a proprietary encrypted network, a public encrypted network, the Internet or other suitable communication network that may include both wired and wireless connections. Passenger pod assembly system 704 communicates with flight control system 708 via a communication channel 730 that preferably includes a wired connection.

Passenger pod assembly system 704 preferably includes a cockpit display device 732 configured to display information to an onboard pilot. Cockpit display device 732 may be configured in any suitable form, including, for example, as one or more display screens such as liquid crystal displays, light emitting diode displays and the like or any other suitable display type including, for example, a display panel or dashboard display. Passenger pod assembly system 704 may also include audio output and input devices such as a microphone, speakers and/or an audio port allowing an onboard pilot to communicate with, for example, an operator at a transportation services provider facility. Cockpit display device 732 may also serve as a pilot input device 734 if a touch screen display implementation is used, however, other user interface devices may alternatively be used to allow an onboard pilot to provide control commands to a flying frame being operated responsive to onboard pilot control including, for example, a control panel, mechanical control devices or other control devices. As should be apparent to those that are skilled in the art, through the use of system 700 a flying frame of the present disclosure can be operated responsive to a flight control protocol including autonomous flight control, remote flight control, onboard pilot flight control and combinations thereof.

Figure 12:
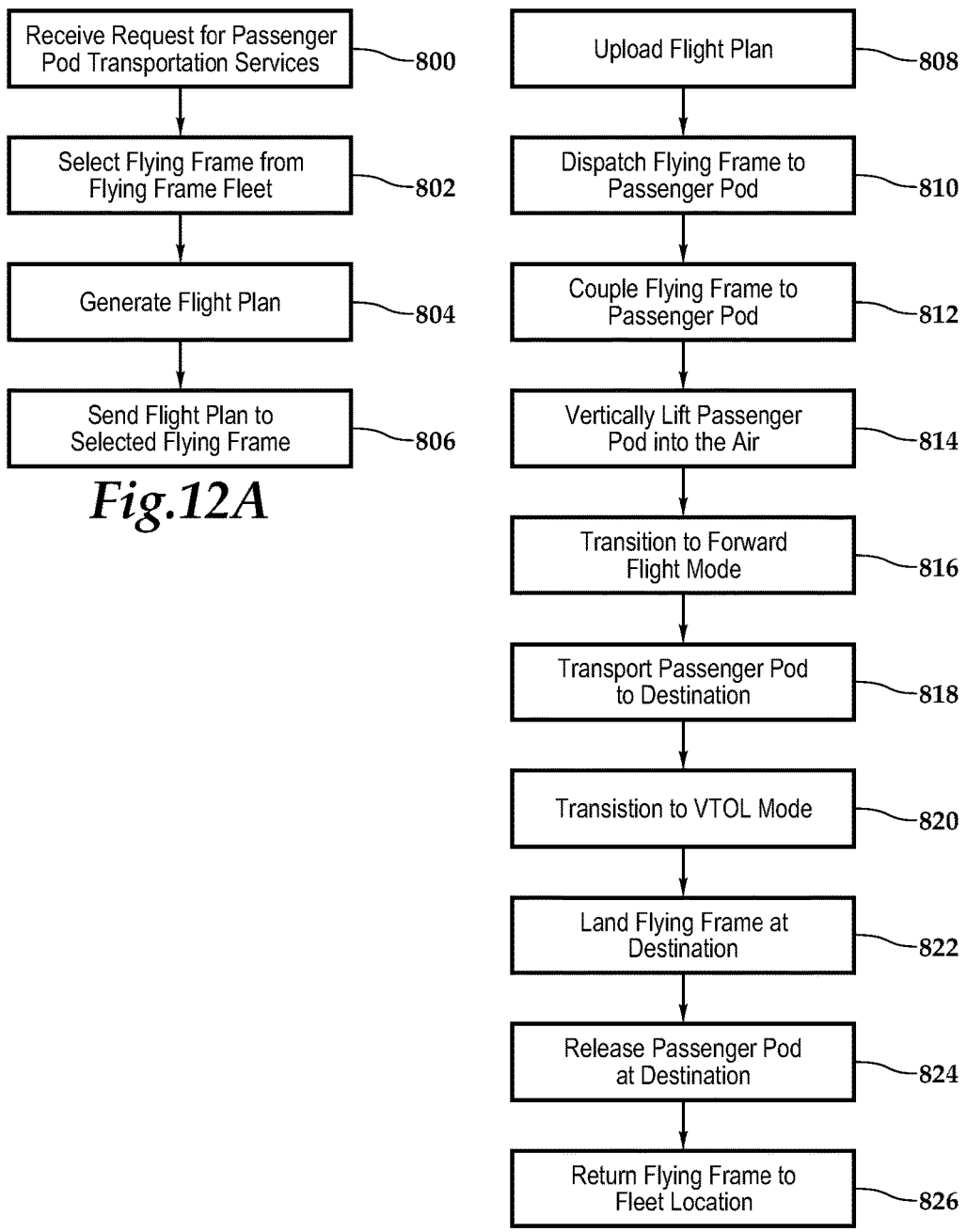
FIGS. 12A-12B are block diagrams of a transportation process in accordance with embodiments of the present disclosure.

Referring now to FIGS. 12A-12B of the drawings, one embodiment of a process for transporting a passenger pod assembly by air from a current location to a destination will now be described. A first step of the process involves receiving a request for transportation services by a transportation services provider, as indicated in block 800 of FIG. 12A. The request may be made over a telephone network from a person desiring transportation of a pod assembly and received by an operator at the transportation services provider, in which case, the operator logs the request into the transportation services provider computing system. Alternatively, the request may be received directly by the transportation services provider computing system over a data communication network from a computer device, such as a desktop computer or mobile computing device, of the person desiring transportation. Once the transportation request is received in the transportation services provider computing system, a flying frame is selected from the fleet of flying frame maintained at a flying frame hub or other transportation services provider location, as indicated in block 802. The transportation services provider computing system then generates a flight plan, as indicated in block 804, including at least the current location of the pod assembly seeking transportation and the destination location for the pod assembly. The next step involves sending the flight plan from the transportation services provider computing system to the flight control system of the selected flying frame, as indicated in block 806. Depending upon the relative locations of the transportation services provider computing system and the selected flying frame, this communication may take place via a wired and/or wireless communication network such as a local area network, a wireless local area network, the Internet or other suitable network.

The reminder of the steps of the present embodiment of a process for transporting the passenger pod assembly are performed by the flight control system of the selected flying frame, as best seen in FIG. 12B. The next step involves uploading the flight plan to the flight control system of the selected flying frame, as indicated in block 808. The flying frame may now be operated responsive to autonomous flight control, remote flight control or a combination thereof. Regardless of flight control mode, the next step is dispatching the selected flying frame from the transportation services provider location to the current location of the pod assembly to be transported, as indicated in block 810. This step may involve departing from the transportation services provider location, selecting a flight path to the current location of the pod assembly, identifying a landing zone proximate the current location of the pod assembly, performing an approach and landing, then positioning the flying frame relative to the pod assembly to enable attachment therebetween. The next step is coupling the flying frame to pod assembly, as indicated in block 812. The process of coupling the flying frame to the pod assembly may be autonomous, manual or a combination thereof. In any case, the coupling process including forming a mechanical connection and preferably establishing a communication channel therebetween.

The flying frame may now be operated responsive to autonomous flight control, remote flight control, onboard pilot flight control or a combination thereof. Once the pod assembly is properly coupled to the flying frame, the flying frame lifts the pod assembly into the air in a vertical takeoff and landing mode, as indicated in block 814. During the vertical takeoff, the pod assembly is preferably maintained in a generally horizontal attitude and each of the propulsion assemblies of the distributed propulsion system are independently operated using, for example, selective collective pitch and selective thrust vectoring as discussed herein. Once the flying frame has reached a desired altitude in vertical takeoff and landing mode, the next step is transitioning the flying frame from the vertical takeoff and landing mode to a forward flight mode, as indicate in block 816. Preferably, this transition involves rotating the flying frame relative to the pod assembly such that the pod assembly remains in the generally horizontal attitude.

Once in forward flight mode, the next step is transporting the pod assembly to the desired destination location, as indicated in block 818. Depending upon factors such as the distance of travel and environmental conditions, it may be desirable to shut down certain propulsion assemblies, as discussed herein, during forward flight. As the flying frame approaches the destination, the next step is transitioning the flying frame from the forward flight mode to the vertical takeoff and landing mode, as indicated in block 820. Preferably, this transition involves rotating the flying frame relative to the pod assembly such that the pod assembly remains in the generally horizontal attitude. The next step is landing the flying frame at the destination, as indicated in block 822. This step may involve identifying a landing zone and performing an approach in the vertical takeoff and landing mode. Once on the ground, the flying frame may release the pod assembly at the destination location, as indicated in block 824. Thereafter, the next step is returning the flying frame from the destination of the pod assembly to the transportation services provider location, as indicate in block 826.

As should be understood by those skilled in the art, the process for transporting a passenger pod assembly by air from its current location to a destination described with reference to FIGS. 12A-12B is merely one example of many missions a flying frame of the present disclosure could perform. While the described mission included a round trip from a transportation services provider location to provide transportation to a single pod assembly, a flying frame of the present disclosure could alternatively provide sequential transportation events for multiple pod assemblies during a single trip into the field without returning to the transportation services provider location in between. Likewise, a flying frame of the present disclosure could transport a single pod assembly to multiple locations with multiple takeoff and landing events during a single mission. Accordingly, those skilled in the art will recognize that the flying frames of the present disclosure may perform an array of useful and versatile missions involving transportation of a variety of manned and unmanned pod assemblies.

Figure 13:
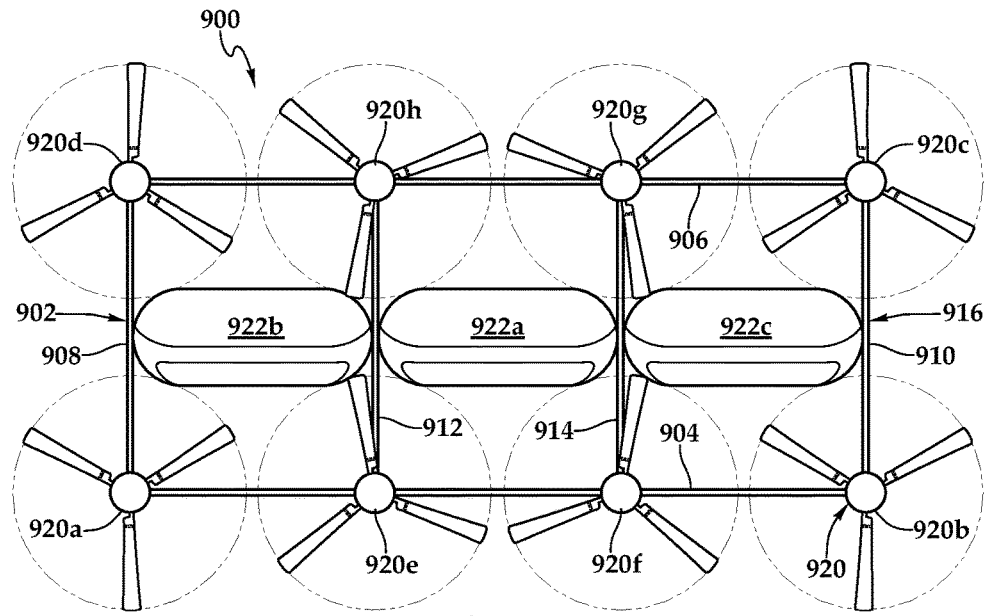
FIG. 13 is a schematic illustration of an aircraft in accordance with embodiments of the present disclosure.

Even though the present disclosure has depicted and described flying frames operable to selectively attach to a single pod assembly, it should be understood by those skilled in the art that flying frames of the present disclosure may alternatively carry more than one pod assembly as seen, for example, in FIG. 13. In the illustrated embodiment, aircraft 900 including a flying frame 902 having wing members 904, 906, outboard pylons 908, 910 and inboard pylons 912, 914 forming airframe 916. Flying frame 902 also includes a distributed propulsion system 920 depicted as eight independent propulsion assemblies 920A-920H. Flying frame 902 includes a flight control system that may be disposed within a nacelle of distributed propulsion system 920 that communicates with the electronics nodes of each propulsion assembly 920A-920H receiving sensor data from and sending flight command information to the electronics nodes, thereby individually and independently controlling and operating each propulsion assembly 920A-920H. Aircraft 900 has a vertical takeoff and landing mode and a forward flight mode as described herein. In the illustrated embodiment, aircraft 900 includes three pod assemblies, illustrated as passenger pod assemblies 922A-922C, that are selectively attachable to flying frame 902 as discussed herein. Pod assembly 922A is selectively coupled between inboard pylons 912, 914, pod assembly 922B is selectively coupled between outboard pylon 908 and inboard pylon 912 and pod assembly 922C is selectively coupled between inboard pylon 914 and outboard pylon 910. Even though FIG. 13 depicts three passenger pod assemblies being carried by a flying frame of the present disclosure, it should be understood by those skilled in the art that flying frames of the present disclosure may alternatively carry other types of pod assemblies including, but not limited to, fuel pod assemblies, cargo pod assemblies, weapons pod assemblies and the like and combinations thereof.

Figure 14:
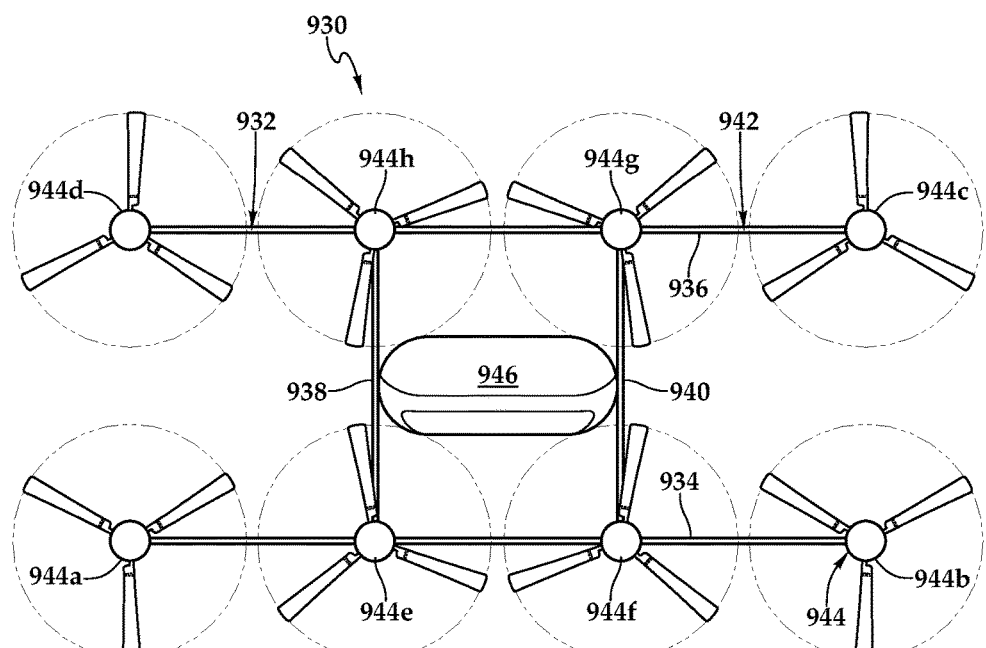
FIG. 14 is a schematic illustration of an aircraft in accordance with embodiments of the present disclosure.

Even though the present disclosure has depicted and described flying frames having a particular structural configuration, it should be understood by those skilled in the art that flying frames of the present disclosure may alternatively have other structural configurations as seen, for example, in FIG. 14. In the illustrated embodiment, aircraft 930 including a flying frame 932 having wing members 934, 936 and pylons 938, 940 forming airframe 942. Flying frame 932 also includes a distributed propulsion system 942 depicted as eight independent propulsion assemblies 944A-944H. Flying frame 932 includes a flight control system that may be disposed within a nacelle of distributed propulsion system 944 that communicates with the electronics nodes of each propulsion assembly 944A-944H receiving sensor data from and sending flight command information to the electronics nodes, thereby individually and independently controlling and operating each propulsion assembly 944A-944H. Aircraft 930 has a vertical takeoff and landing mode and a forward flight mode as described herein. In the illustrated embodiment, aircraft 930 includes a pod assembly, illustrated as passenger pod assembly 946. Unlike previously described flying frames of the present disclosure, flying frame 932 does not include outboard pylons, which may reduce the overall weight of aircraft 930.

Figure 15:
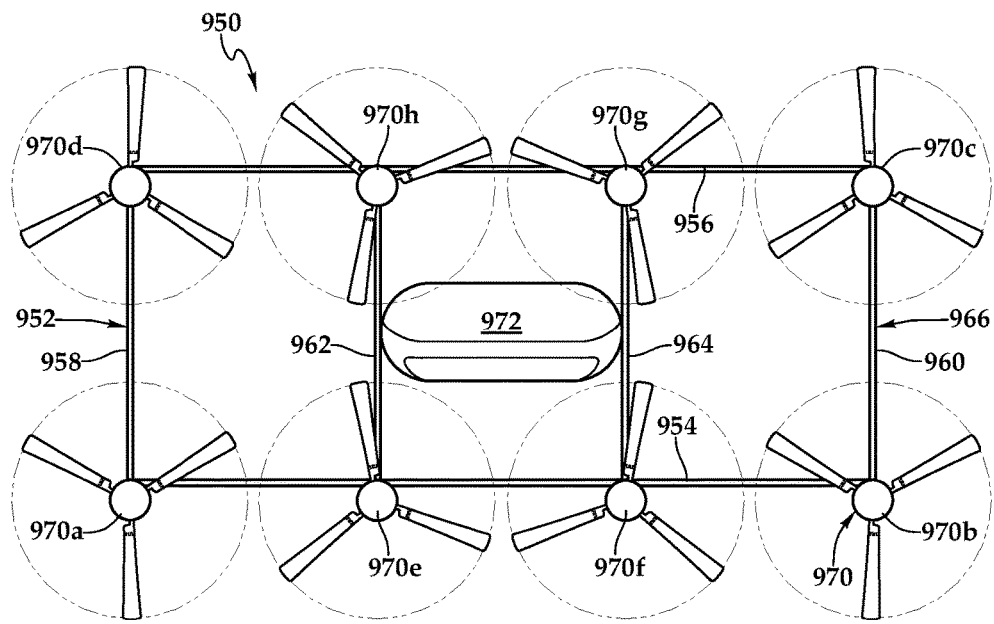
FIG. 15 is a schematic illustration of an aircraft in accordance with embodiments of the present disclosure.

Even though the present disclosure has depicted and described aircraft having distributed propulsion systems with independent propulsion assemblies attached to flying frames in a mid wing configuration, it should be understood by those skilled in the art that aircraft of the present disclosure may have distributed propulsion systems with independent propulsion assemblies attached to flying frames in alternative configurations as seen, for example, in FIG. 15. In the illustrated embodiment, aircraft 950 including a flying frame 952 having wing members 954, 956, outboard pylons 958, 960 and inboard pylons 962, 964 forming airframe 966. Flying frame 952 also includes a distributed propulsion system 970 depicted as eight independent propulsion assemblies 970A-970H. Flying frame 952 includes a flight control system that may be disposed within a nacelle of distributed propulsion system 970 that communicates with the electronics nodes of each propulsion assembly 970A-970H receiving sensor data from and sending flight command information to the electronics nodes, thereby individually and independently controlling and operating each propulsion assembly 970A-970H. Aircraft 950 has a vertical takeoff and landing mode and a forward flight mode as described herein. In the illustrated embodiment, aircraft 950 includes a pod assembly, illustrated as passenger pod assembly 972, that is selectively attachable to flying frame 952. As illustrated, propulsion assemblies 970A-970H are not attached to wing members 954, 956 in a mid wing configuration but are instead attached in a high wing configuration to outboard pylons 958, 960 and inboard pylons 962, 964 which include support assemblies (not visible) that extend below wing member 954 when aircraft 950 is in its illustrated forward flight mode. This configuration of a distributed propulsion system wherein the propulsion assemblies are positioned below the wings may provide greater wing surface area to enhance the aerodynamic performance of aircraft 950. Propulsion assemblies 970A-970H may have an angle of attack less than that of wing members 954, 956, for example two to five degrees, to further enhance the aerodynamic performance of aircraft 950. Alternatively and additionally, some or all of propulsion assemblies 970A-970H may be operated with an angle of attack less than that of wing members 954, 956 using trust vectoring as discussed herein. As another alternative, propulsion assemblies 970A-970H could be attached to flying frame 952 in a low wing configuration with propulsion assemblies 970A-970H above respective wing members 954, 956 or propulsion assemblies 970A-970H could be attached to flying frame 95 using a combination of mid wing configuration, high wing configuration and/or low wing configuration.

Figure 16:
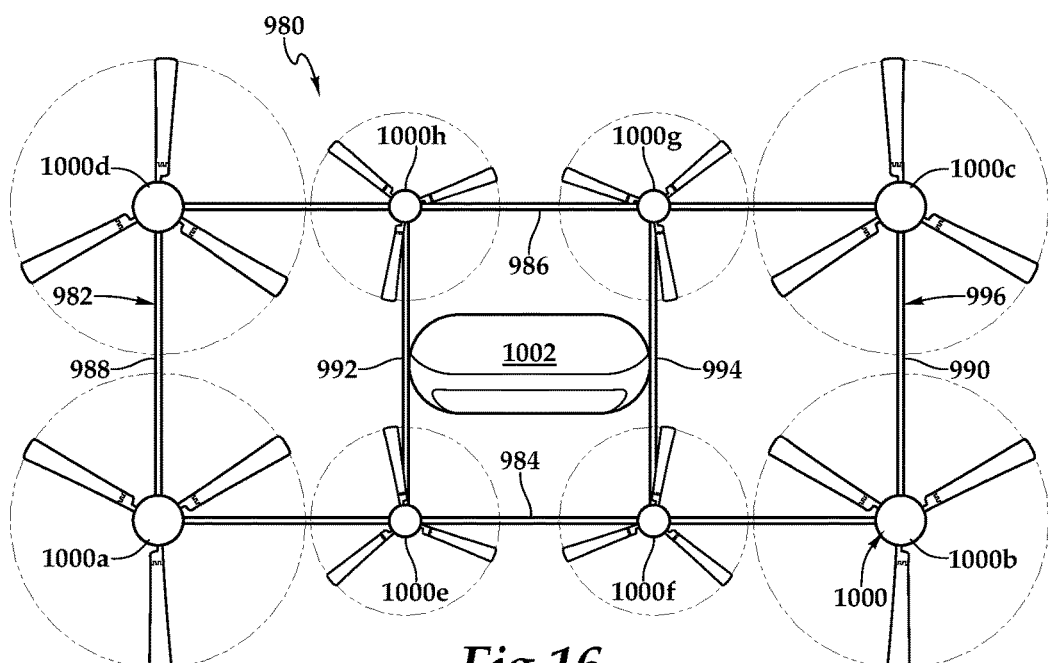
FIG. 16 is a schematic illustration of an aircraft in accordance with embodiments of the present disclosure.

Even though the present disclosure has depicted and described aircraft having distributed propulsion systems with independent propulsion assemblies having proprotor blades of a uniform design, it should be understood by those skilled in the art that aircraft of the present disclosure may have distributed propulsion systems with independent propulsion assemblies having proprotor blades with different designs as seen, for example, in FIG. 16. In the illustrated embodiment, aircraft 980 including a flying frame 982 having wing members 984, 986, outboard pylons 988, 990 and inboard pylons 992, 994 forming airframe 996. Flying frame 982 also includes a distributed propulsion system 1000 depicted as eight independent propulsion assemblies 1000A-1000H. Flying frame 982 includes a flight control system that may be disposed within a nacelle of distributed propulsion system 1000 that communicates with the electronics nodes of each propulsion assembly 1000A-1000H receiving sensor data from and sending flight command information to the electronics nodes, thereby individually and independently controlling and operating each propulsion assembly 1000A-1000H. Aircraft 980 has a vertical takeoff and landing mode and a forward flight mode as described herein. In the illustrated embodiment, aircraft 980 includes a pod assembly, illustrated as passenger pod assembly 1002, that is selectively attachable to flying frame 982.

Unlike previously described propulsion assemblies of the present disclosure, propulsion assemblies 1000A-1000H have proprotor blades with different designs. As illustrated, the span and chord lengths of the proprotor blades of inboard propulsion assemblies 1000E-1000H are less than the span and chord lengths of the proprotor blades of outboard propulsion assemblies 1000A-1000D. As described herein, significantly more thrust is required during vertical takeoff and landing as compared to forward flight. When maximum thrust is required during vertical takeoff and landing, all propulsion assemblies 1000A-1000D are operated with the larger proprotor blades of outboard propulsion assemblies 1000A-1000D generally having greater lift efficiency and enabling operations with heavier payloads. When reduced thrust is required during forward flight, however, outboard propulsion assemblies 1000A-1000D could be shut down to conserve power with inboard propulsion assemblies 1000E-1000H operating to provide all the required thrust, thereby increasing aircraft endurance. As discussed herein, when outboard propulsion assemblies 1000A-1000D are shut down, the associated proprotor blades may passively fold or be feathered to reduce drag and further improve aircraft endurance. As an alternative or in addition to having proprotor blades of different length, proprotor blades of a distributed propulsion system of the present disclosure could also have different blade twist, different angles of attack in fixed pitch embodiments, different pitch types such as a combination of fixed pitch and variable pitch proprotor blades, different blade shapes and the like.

Figure 17:
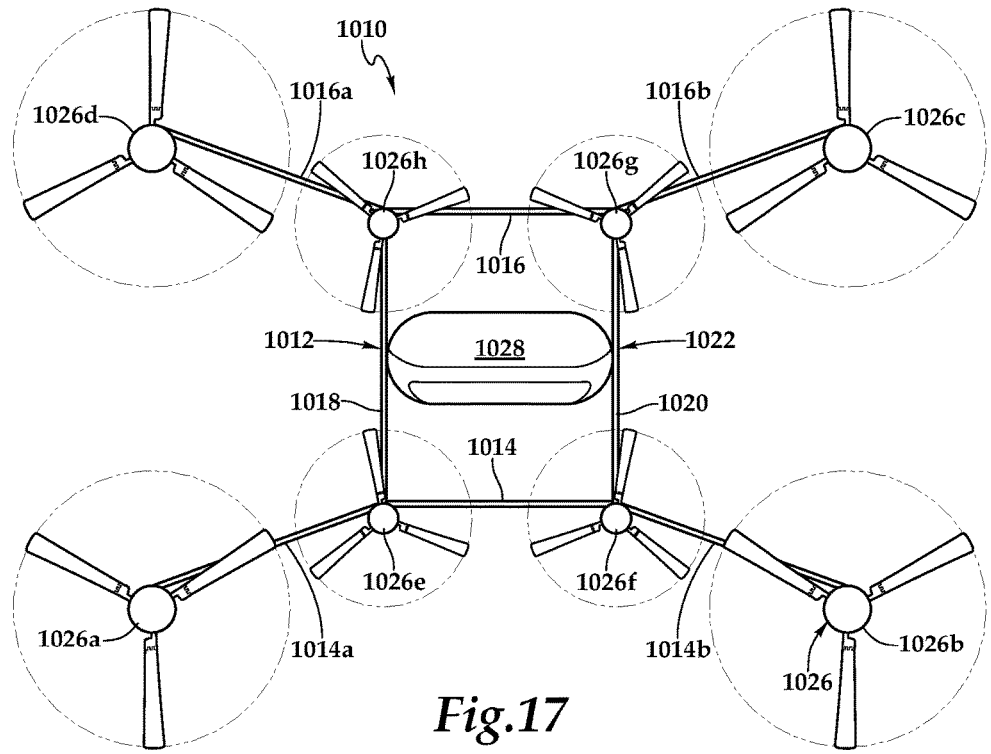
FIG. 17 is a schematic illustration of an aircraft in accordance with embodiments of the present disclosure.

Even though the present disclosure has depicted and described aircraft having straight wings, it should be understood by those skilled in the art that aircraft of the present disclosure may have wings having alternate designs as seen, for example, in FIG. 17. In the illustrated embodiment, aircraft 1010 including a flying frame 1012 having wing members 1014, 1016 and pylons 1018, 1020 forming airframe 1022. Flying frame 1012 also includes a distributed propulsion system 1026 depicted as eight independent propulsion assemblies 1026A-1026H attached to flying frame 1012 in a high wing configuration. Flying frame 1012 includes a flight control system that may be disposed within a nacelle of distributed propulsion system 1026 that communicates with the electronics nodes of each propulsion assembly 1026A-1026H receiving sensor data from and sending flight command information to the electronics nodes, thereby individually and independently controlling and operating each propulsion assembly 1026A-1026H. Aircraft 1010 has a vertical takeoff and landing mode and a forward flight mode as described herein. In the illustrated embodiment, aircraft 1010 includes a pod assembly, illustrated as passenger pod assembly 1028, that is selectively attachable to flying frame 1012. As illustrated, wing members 1014, 1016 are polyhedral wings with wing member 1014 having anhedral sections 1014A, 1014B and with wing member 1016 having dihedral sections 1016A, 1016B. It is noted that in this design, fuel stored in the anhedral sections 1014A, 1014B and dihedral sections 1016A, 1016B of wing members 1014, 1016 will gravity feed to feed tanks in specific propulsion assemblies 1026A-1026H during forward flight.

Figure 18:
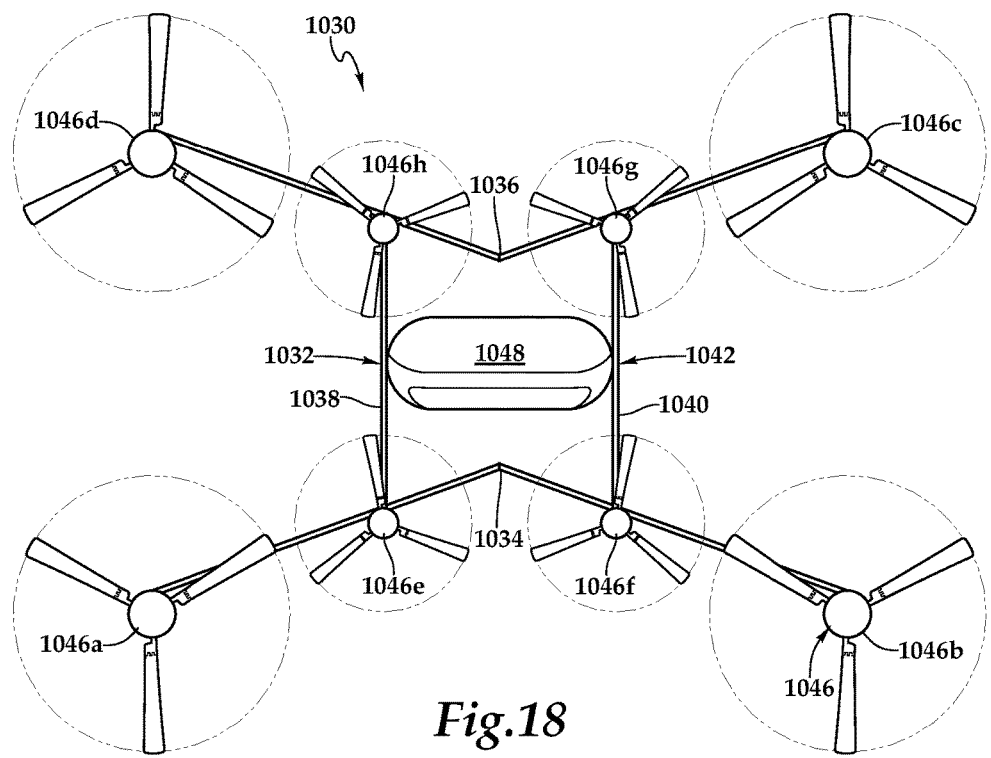
FIG. 18 is a schematic illustration of an aircraft in accordance with embodiments of the present disclosure.

As another example, FIG. 18 depicts aircraft 1030 including a flying frame 1032 having wing members 1034, 1036 and pylons 1038, 1040 forming airframe 1042. Flying frame 1032 also includes a distributed propulsion system 1046 depicted as eight independent propulsion assemblies 1046A-1046H attached to flying frame 1032 in a high wing configuration. Flying frame 1032 includes a flight control system that may be disposed within a nacelle of distributed propulsion system 1046 that communicates with the electronics nodes of each propulsion assembly 1046A-1046H receiving sensor data from and sending flight command information to the electronics nodes, thereby individually and independently controlling and operating each propulsion assembly 1046A-1046H. Aircraft 1030 has a vertical takeoff and landing mode and a forward flight mode as described herein. In the illustrated embodiment, aircraft 1030 includes a pod assembly, illustrated as passenger pod assembly 1048, that is selectively attachable to flying frame 1032. As illustrated, wing member 1034 is an anhedral wing and wing member 1036 is a dihedral wing.

Figure 19:
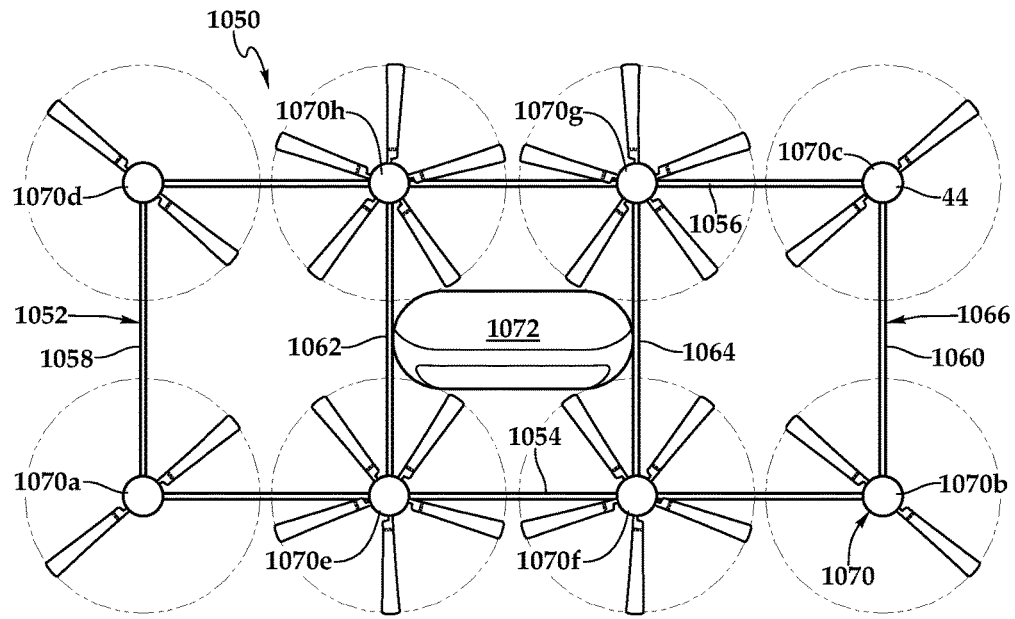
FIG. 19 is a schematic illustration of an aircraft in accordance with embodiments of the present disclosure.

Even though the present disclosure has depicted and described aircraft having distributed propulsion systems with independent propulsion assemblies having proprotor with a uniform number of proprotor blades, it should be understood by those skilled in the art that aircraft of the present disclosure may have distributed propulsion systems with independent propulsion assemblies having proprotors with different numbers of blades as seen, for example, in FIG. 19. In the illustrated embodiment, aircraft 1050 including a flying frame 1052 having wing members 1054, 1056, outboard pylons 1058, 1060 and inboard pylons 1062, 1064 forming airframe 1066. Flying frame 1052 also includes a distributed propulsion system 1070 depicted as eight independent propulsion assemblies 1070A-1070H. Flying frame 1052 includes a flight control system that may be disposed within a nacelle of distributed propulsion system 1070 that communicates with the electronics nodes of each propulsion assembly 1070A-1070H receiving sensor data from and sending flight command information to the electronics nodes, thereby individually and independently controlling and operating each propulsion assembly 1070A-1070H. Aircraft 1050 has a vertical takeoff and landing mode and a forward flight mode as described herein. In the illustrated embodiment, aircraft 1050 includes a pod assembly, illustrated as passenger pod assembly 1072, that is selectively attachable to flying frame 1052.

Unlike previously described propulsion assemblies of the present disclosure having proprotors with three blades each, propulsion assemblies 1070A-1070H have proprotor with different numbers of proprotor blades. As illustrated, the proprotors of inboard propulsion assemblies 1070E-1070H each have five proprotor blades and the proprotors of outboard propulsion assemblies 1000A-1000D each have two proprotor blades. As described herein, significantly more thrust is required during vertical takeoff and landing as compared to forward flight. When maximum thrust is required during vertical takeoff and landing, all propulsion assemblies 1070A-1070H are operated. When reduced thrust is required during forward flight, inboard propulsion assemblies 1070E-1070H, with five proprotor blades, could be shut down to conserve power with outboard propulsion assemblies 1000A-1000D, with two proprotor blades, operating to provide all the required thrust. As discussed herein, when inboard propulsion assemblies 1070E-1070H are shut down, the associated proprotor blades may passively fold or be feathered to reduce drag and improve aircraft endurance.

Figure 20:
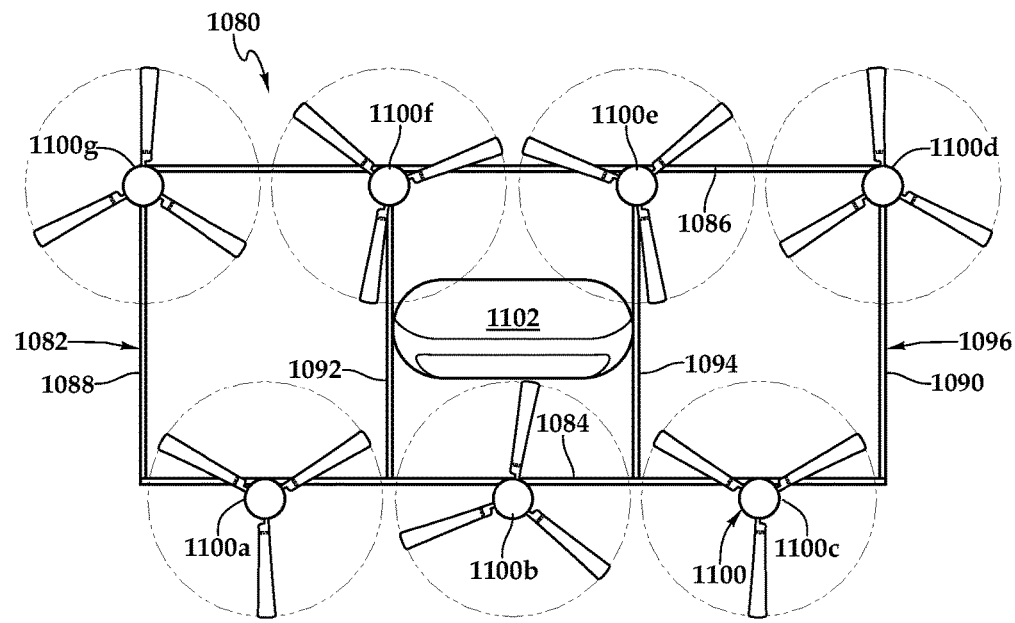
FIG. 20 is a schematic illustration of an aircraft in accordance with embodiments of the present disclosure.

Even though the present disclosure has depicted and described aircraft having distributed propulsion systems with an even number of symmetrically positioned independent propulsion assemblies, it should be understood by those skilled in the art that aircraft of the present disclosure may have distributed propulsion systems with other orientations of independent propulsion assemblies as seen, for example, in FIG. 20. In the illustrated embodiment, aircraft 1080 including a flying frame 1082 having wing members 1084, 1086, outboard pylons 1088, 1090 and inboard pylons 1092, 1094 forming airframe 1096. Flying frame 1082 also includes a distributed propulsion system 1100 depicted as eight independent propulsion assemblies 1100A-1100H attached to flying frame 1082 in a high wing configuration. Flying frame 1082 includes a flight control system that may be disposed within a nacelle of distributed propulsion system 1100 that communicates with the electronics nodes of each propulsion assembly 1100A-1100H receiving sensor data from and sending flight command information to the electronics nodes, thereby individually and independently controlling and operating each propulsion assembly 1100A-1100H. Aircraft 1080 has a vertical takeoff and landing mode and a forward flight mode as described herein. In the illustrated embodiment, aircraft 1080 includes a pod assembly, illustrated as passenger pod assembly 1102, that is selectively attachable to flying frame 1082. As illustrated, aircraft 1080 features a high wing configuration with four propulsion assemblies 1100D-1100G positioned below wing 1086 and three propulsion assemblies 1100A-1100C positioned below wing 1084 forming a nonsymmetrical array of propulsion assemblies.

Embodiments of methods, systems and program products of the present disclosure have been described herein with reference to drawings. While the drawings illustrate certain details of specific embodiments that implement the methods, systems and program products of the present disclosure, the drawings should not be construed as imposing on the disclosure any limitations that may be present in the drawings. The embodiments described above contemplate methods, systems and program products stored on any non-transitory machine-readable storage media for accomplishing its operations. The embodiments may be implemented using an existing computer processor or by a special purpose computer processor incorporated for this or another purpose or by a hardwired system.

Certain embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, logics, objects, components, data structures, and the like that perform particular tasks or implement particular abstract data types. Machine-executable instructions, associated data structures and program modules represent examples of program code for executing steps of the methods disclosed herein. The particular sequence of such executable instructions or associated data structures represents examples of corresponding acts for implementing the functions described in such steps.

Embodiments of the present disclosure may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Embodiments of the disclosure may also be practiced in distributed computing environments where tasks are performed by local and remote processing devices that are linked through a communications network including hardwired links, wireless links and/or combinations thereof. In a distributed computing environment, program modules may be located in both local and remote memory storage devices.

An exemplary implementation of embodiments of methods, systems and program products disclosed herein might include general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the present disclosure. Likewise, software and web implementations of the present disclosure could be accomplished with standard programming techniques using rule based logic and other logic to accomplish the various processes.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft comprising:
   a flying frame including an airframe, a propulsion system attached to the airframe and a flight control system operably associated with the propulsion system, the airframe including first and second wing members having at least two pylons extending therebetween; and
   a pod assembly selectively attachable to the flying frame,
   wherein, the flying frame has a vertical takeoff and landing mode in which the first and second wing members are substantially above the pod assembly and a forward flight mode in which the first wing member is below the pod assembly and the second wing member is above the pod assembly; and
   wherein, the flying frame is rotatable about the pod assembly such that the pod assembly remains in a generally horizontal attitude during vertical takeoff and landing, forward flight and transitions therebetween.

2. The aircraft as recited in claim 1 wherein, in the vertical takeoff and landing mode, the first wing member is forward of the pod assembly and the second wing member is aft of the pod assembly and wherein, in the forward flight mode, the first wing member is below the pod assembly and the second wing member is above the pod assembly.

3. The aircraft as recited in claim 1 wherein the pod assembly is rotatably mounted to the pylons.

4. The aircraft as recited in claim 1 wherein, in the forward flight mode, the pod assembly is operable to translate in forward and aft directions relative to the flying frame such that the center of gravity of the aircraft is adjustable.

5. The aircraft as recited in claim 1 wherein the pod assembly and the flying frame have at least one communication channel therebetween operable to enable communication between the pod assembly and the flight control system of the flying frame.

6. The aircraft as recited in claim 1 wherein the pod assembly further comprises a manned pod assembly.

7. The aircraft as recited in claim 1 wherein the pod assembly further comprises an unmanned pod assembly.

8. The aircraft as recited in claim 1 wherein the flying frame is operable to jettison the pod assembly during flight.

9. The aircraft as recited in claim 8 wherein the pod assembly further comprises a parachute operable to be deployed in association with the pod assembly being jettisoned from the flying frame during flight.

10. The aircraft as recited in claim 9 wherein the parachute further comprises a parafoil parachute.

11. The aircraft as recited in claim 8 wherein the pod assembly further comprises a watertight pod assembly.

12. The aircraft as recited in claim 1 wherein the flying frame is operable to couple with and decouple from the pod assembly when the flying frame is positioned on a surface.

13. The aircraft as recited in claim 1 wherein the flying frame is operable to autonomously couple with and decouple from the pod assembly.

14. A method of operating an aircraft comprising:
providing a flying frame including an airframe, a propulsion system attached to the airframe and a flight control system operably associated with the propulsion system, the airframe including first and second wing members having at least two pylons extending therebetween;
selectively attaching the flying frame to a pod assembly;
lifting the pod assembly into the air in a vertical takeoff and landing mode of the aircraft with the pod assembly in a generally horizontal attitude;
transitioning the aircraft between the vertical takeoff and landing mode, in which the first and second wing members are substantially above the pod assembly, and a forward flight mode, in which the first wing member is below the pod assembly and the second wing member is above the pod assembly, by rotating the flying frame relative to the pod assembly while maintaining the pod assembly in the generally horizontal attitude; and
transporting the pod assembly in the forward flight mode of the aircraft with the pod assembly in the generally horizontal attitude.

15. The method as recited in claim 14 wherein selectively attaching the flying frame to the pod assembly further comprises rotatably mounting the pod assembly to the pylons.

16. The method as recited in claim 14 further comprising jettisoning the pod assembly from the flying frame during flight.

17. The method as recited in claim 14 wherein selectively attaching the flying frame to the pod assembly further comprises operably coupling the flying frame to and decoupling the flying from the pod assembly when the flying frame is positioned on a surface.

18. The method as recited in claim 14 wherein selectively attaching the flying frame to the pod assembly further comprises autonomously coupling the flying frame to and decoupling the flying from the pod assembly.

* * * * *